(12) United States Patent
Ducellier

(10) Patent No.: US 11,567,264 B2
(45) Date of Patent: Jan. 31, 2023

(54) WAVELENGTH SEPARATED FINE STEERING ASSEMBLY

(71) Applicant: COM DEV LTD., Mississauga (CA)

(72) Inventor: Thomas Ducellier, Ottawa (CA)

(73) Assignee: COM DEV LTD., Mississauga (CA)

( * ) Notice: Subject to any disclaimer, the term of this patent is extended or adjusted under 35 U.S.C. 154(b) by 72 days.

(21) Appl. No.: 17/243,359

(22) Filed: Apr. 28, 2021

(65) Prior Publication Data

US 2022/0350083 A1  Nov. 3, 2022

(51) Int. Cl.
*G02B 6/293* (2006.01)
*H04B 10/40* (2013.01)
*H04B 10/118* (2013.01)
*H04B 10/112* (2013.01)

(52) U.S. Cl.
CPC ..... *G02B 6/29361* (2013.01); *G02B 6/29395* (2013.01); *H04B 10/118* (2013.01); *H04B 10/1127* (2013.01); *H04B 10/40* (2013.01)

(58) Field of Classification Search
CPC ............ G02B 6/29395; G02B 6/29361; G02B 6/29362; G02B 6/29364; G02B 6/29367; G02B 6/29365; G02B 27/141; H04B 10/1127; H04B 10/118
See application file for complete search history.

(56) References Cited

U.S. PATENT DOCUMENTS

| 9,438,338 B1 * | 9/2016 | Chan ..................... H04B 10/11 |
|---|---|---|
| 10,225,011 B1 | 3/2019 | Schubert et al. |
| 10,495,839 B1 | 12/2019 | Carlson et al. |
| 2001/0043379 A1 | 11/2001 | Bloom et al. |

(Continued)

FOREIGN PATENT DOCUMENTS

| JP | H10276135 A | 10/1998 |
|---|---|---|
| KR | 20130093564 A | 8/2013 |

(Continued)

OTHER PUBLICATIONS

U.S. Appl. No. 16/929,436, filed Jul. 15, 2020, naming inventor Ducellier.

(Continued)

*Primary Examiner* — Thomas A Hollweg
*Assistant Examiner* — Mary A El-Shammaa
(74) *Attorney, Agent, or Firm* — Shumaker & Sieffert, P.A.

(57) ABSTRACT

An optical communication system that includes terminals that operate with different, widely separated wavelengths in which a terminal in the system may be configured to function in both a first operational mode and in a second operational mode. For example, a terminal according to the techniques of this disclosure may communicate with full duplex communication by transmitting a first optical wavelength and receiving a second optical wavelength while in the first operational mode. The same terminal may be reconfigured to transmit the second optical wavelength and receive the first optical wavelength while in the second operational mode. In some examples, the terminal may be located in a spacecraft, such as an orbiting satellite or other vehicle, and may communicate with other terminals such as airborne terminals, terminals located at ground station on the Earth's surface, or with terminals located in other spacecraft.

20 Claims, 10 Drawing Sheets

(56) References Cited

U.S. PATENT DOCUMENTS

| | | | | |
|---|---|---|---|---|
| 2007/0031150 | A1* | 2/2007 | Fisher | H04B 10/118 398/128 |
| 2015/0215040 | A1 | 7/2015 | Dickson et al. | |
| 2015/0215041 | A1 | 7/2015 | Pechner | |
| 2015/0244458 | A1 | 8/2015 | Erkmen et al. | |
| 2016/0043800 | A1* | 2/2016 | Kingsbury | H04B 7/18513 398/125 |
| 2018/0088280 | A1* | 3/2018 | Kim | H04B 10/1129 |
| 2018/0097563 | A1 | 4/2018 | Lamarque et al. | |
| 2018/0172915 | A1 | 6/2018 | Kim et al. | |
| 2021/0263299 | A1* | 8/2021 | Ducellier | G02B 23/06 |
| 2022/0014274 | A1* | 1/2022 | Twichell | H04B 10/2589 |

FOREIGN PATENT DOCUMENTS

| | | | |
|---|---|---|---|
| WO | WO-2022008145 | A1 * | 1/2022 |
| WO | WO-2022139986 | A2 * | 6/2022 |

OTHER PUBLICATIONS

Massa, "Fiber Optic Telecommunication," Fundamentals of Photonics, Module 1.8, Springfield Technical Community College, University of Connecticut, (Applicant points out, in accordance with MPEP 609.04(a), that the year of publication, 2000, is sufficiently earlier than the effective U.S. filing date, so that the particular month of publication is not in issue.), pp. 293-347.

"Fiber Optics: How Fused Fiber Optic Couplers Work," Newport, Photonics Technical Note #25, Fiber Optics, accessed from https://www.newport.com/medias/sys_master/images/images/h86/hb2/8797287088158/Tech-Note-26-How-Fused-Fiber-Optic-Couplers-Work.pdf, accessed on Apr. 19, 2021, 4 pp.

Extended Search Report from counterpart European Application No. 22167422.9 dated Oct. 25, 2022, 5 pp.

* cited by examiner

WAVELENGTH SEPARATED FINE STEERING ASSEMBLY

TECHNICAL FIELD

This disclosure relates to free space optical communication, and more particularly to duplex optical communication.

BACKGROUND

For free space optical communication between terminals separated by long communication distances, which may range in thousands of kilometres or hundreds of thousands of kilometres, there is an extreme power difference between the powerful transmit laser beam from the transmitting terminal (e.g., up to a few Watts of power) and the very weak received signal at the receiving terminal (which may be in the tens of nanowatts). To save costs and for size, weight, power (SWaP) reasons, it may be preferable to have a unique optical train for both transmit and receive signals. Therefore, optical communication systems may have extreme isolation between receive and transmit channels (e.g., up to 70 decibel (dB)+). A duplex communication system is a point-to-point system with of two or more connected terminals that can communicate with one another in both directions. Full duplex (FDX) allows for the simultaneous transmission of information. In a half-duplex (HDX) system, communication flows in one direction at a time.

SUMMARY

In general, this disclosure describes an optical communication system that includes terminals that operate with different, widely separated wavelengths in which a terminal in the system may be configured to function in both a first operational mode and in a second operational mode. For example, a terminal according to the techniques of this disclosure, may communicate with full duplex communication by transmitting a first optical wavelength and receiving a second optical wavelength while in the first operational mode. The same terminal may be reconfigured to transmit the second optical wavelength and receive the first optical wavelength while in the second operational mode. In some examples, the terminal may be located in a spacecraft, such as an orbiting satellite, and may communicate with other terminals located at a ground station on the Earth's surface, or with terminals located for example, in other spacecrafts.

In one example, this disclosure describes an optical communication device configured for duplex communication, the device comprising a first light coupling port; a second light coupling port; a first dichroic reflector configured to substantially reflect a first wavelength, pass a portion of the first wavelength, and pass a second wavelength; a second dichroic reflector configured to substantially pass the second wavelength, reflect a portion of the second wavelength, and reflect the first wavelength, wherein the second dichroic reflector is located between the second light coupling port and the first dichroic reflector, and a fine steering module. While the device is in a first operational mode, the first dichroic reflector is configured to: substantially reflect a first outgoing signal at the first wavelength from the first light coupling port to the fine steering module, and to pass a first incoming signal at the second wavelength from the fine steering module to the second dichroic reflector. While the device is in a second operational mode, the first dichroic reflector is configured to: substantially reflect a second incoming signal at the first wavelength from the fine steering module to the first light coupling port; pass a portion of the second incoming signal at the first wavelength from the fine steering module to the second dichroic reflector; and pass a second outgoing signal at the second wavelength from the second dichroic reflector to the fine steering module, and wherein the second dichroic reflector is configured to: substantially pass the first incoming signal at the second wavelength from the first dichroic reflector to the second light coupling port and to reflect a portion of the first incoming signal at the second wavelength from the first dichroic reflector during the first operational mode; and reflect the portion of the second incoming signal at the first wavelength from the first dichroic reflector and to substantially pass the second outgoing signal at the second wavelength from the second light coupling port to the first dichroic reflector during the second operational mode.

In another example, this disclosure describes a method comprising: while in a first operational mode: receiving, from a first light coupling port, a first outgoing signal at a first wavelength, wherein the first outgoing signal is an optical communication signal; reflecting, by a first dichroic reflector, the first outgoing signal via a fine steering module to a target terminal; passing, by the first dichroic reflector, a first incoming signal at a second wavelength from the target terminal to a second dichroic reflector; substantially passing, by the second dichroic reflector, the first incoming signal at the second wavelength to a second light coupling port; reflecting, by the second dichroic reflector, a portion of the first incoming signal at the second wavelength from the first dichroic reflector; and while in a second operational mode: receiving, from the second light coupling port, a second outgoing signal at the second wavelength; passing, by the second dichroic reflector, the second outgoing signal to the first dichroic reflector; passing, by the first dichroic reflector, the second outgoing signal to the target terminal via the fine steering module; and reflecting, by the first dichroic reflector, a second incoming signal at the first wavelength from the target terminal to the first light coupling port.

In another example, this disclosure describes a system comprising an optical transceiver configured to transmit and receive free space optical communication signals and including a first dichroic reflector configured to substantially reflect a first wavelength, pass a second wavelength and a portion of the first wavelength; a second dichroic reflector configured to substantially pass the second wavelength and reflect the first wavelength and a portion of the second wavelength, wherein the second dichroic reflector is located between a second light coupling port and the first dichroic reflector, and a fine steering module. While the device is in a first operational mode, the first dichroic reflector is configured to: substantially reflect a first outgoing signal at the first wavelength from a first light coupling port to the fine steering module, and to pass a first incoming signal at the second wavelength from the fine steering module to the second dichroic reflector, and while the device is in a second operational mode, the first dichroic reflector is configured to: substantially reflect a second incoming signal at the first wavelength from the fine steering module to the first light coupling port; pass a portion of the second incoming signal at the first wavelength from the fine steering module to the second dichroic reflector; and pass a second outgoing signal at the second wavelength from the second dichroic reflector to the fine steering module, and wherein the second dichroic reflector is configured to: substantially pass the first incoming signal at the second wavelength from the first dichroic reflector to the second light coupling port and to reflect a portion of the first incoming signal at the second wavelength from the first dichroic reflector during the first operational mode; and reflect the portion of the second incoming signal at the first wavelength from the first dichroic reflector and to substantially pass the second outgoing signal at the second wavelength from the second light coupling port to the first dichroic reflector during the second operational mode.

The details of one or more examples of this disclosure are set forth in the accompanying drawings and the description below. Other features, objects, and advantages of the disclosure will be apparent from the description and drawings, and from the claims.

DETAILED DESCRIPTION

Figure 1:
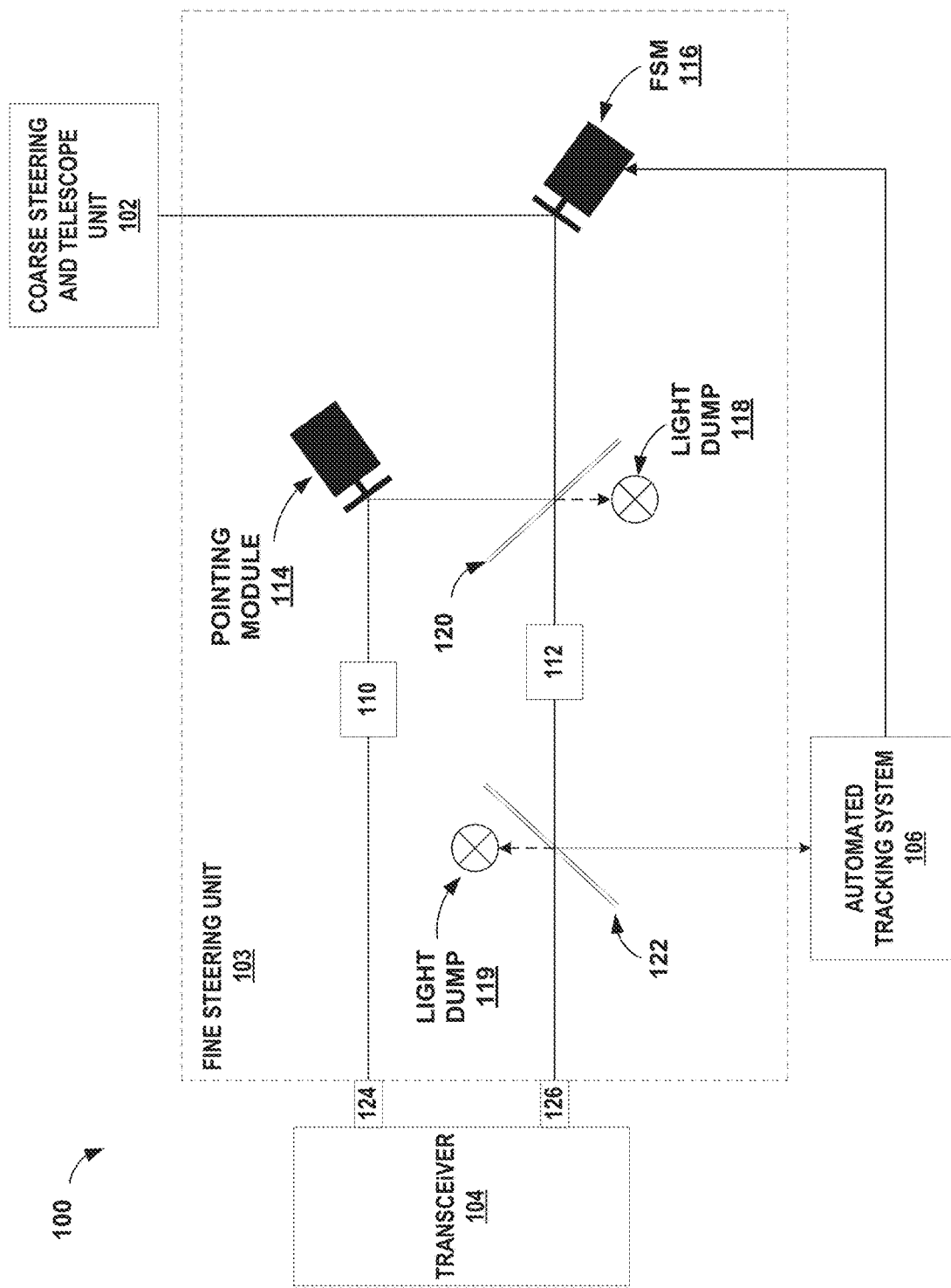
FIG. 1 is a block diagram illustrating an example optical communication system according to one or more techniques of this disclosure.

This disclosure describes an optical communication system that includes a terminal that may be configured to function in either of a first operational mode and in a second operational mode. Specifically, the terminal may communicate with full duplex communication by transmitting a communication signal at a first optical wavelength and receiving a second optical wavelength while in the first operational mode. The same terminal may be reconfigured to transmit messages with the second optical wavelength and receive return messages on the first optical wavelength while in the second operational mode.

Each wavelength for the terminal may have a separate optical pathway with rejection filters arranged to provide a high level of isolation between widely separated wavelengths. For full duplex communication, a first terminal may communicate with a second terminal functioning in a complementary operational mode. That is, the first terminal may be configured as an "A" terminal to operate in the first operational mode, to transmit a powerful signal on the first optical wavelength to the second terminal. The second terminal may be configured as a "B" terminal to operate in the second operational mode with sensitive receivers configured to receive the first optical wavelength, which may be weakened from traveling across great distances, e.g., many thousands of kilometres or by absorption/scattering/distortions through atmosphere. The operational modes are complementary so that the A configured terminal receives the second wavelength transmitted by the B configured terminal, while the B terminal receives the first wavelength transmitted by the A terminal.

For other systems, a terminal may be fixed as an A terminal and is only able to communicate with other B terminals. A fixed terminal may include separate transmit and receive paths with a high degree of isolation. A free space optical (FSO) communication terminal uses isolation because the received power is extremely weak when compared to the transmit power. In some examples, the received power may be seven to eight orders of magnitudes less than the transmit power. This power difference presents a challenge for optical duplex communication terminals in isolating the received signal from background noise coming from the transmit side. In particular, any small amount of backscattering in the optical assembly could create crosstalk and degrade the communication performance of the terminal in the system. Though separate optical paths may provide high isolation levels, separate paths may also increase the cost, weight, and complexity of that type of fixed terminal.

Other examples of fixed terminal systems may include terminals that use different polarization states between receive and transmit modes, and polarizing optics to separate the signal. However, separation by polarization state may be limited to 50 dB and even less with operation over a broad range of usable wavelengths and temperatures, which may not be large enough separation because 70 dB isolation may be preferred for some duplex communication. In other examples, a fixed terminal may use different optical modes between receive and transmit, and similar to polarization, use a mode multiplexer/demultiplexer to sort out signals. However, separation by mode may also limit the maximum amount of isolation between modes that can be achieved in practice to no more than 35-40 dB.

In other examples, terminals may attempt to switch wavelength using a tunable dichroic filter. However, a tunable dichroic filter may be complex, expensive, and not currently available at optical wavelengths used for optical communication, e.g., approximately 1550 nanometers (nm). In other examples, a terminal may attempt to switch wavelength using a mechanical switching mechanism to physically swap "A"-type dichroic filter with "B"-type and vice-versa. However, mechanical switching can be prone to failure and can be challenging to realize in practice because the optical alignment between all optical paths has to be maintained to a very high level of precision. High precision alignment with moving parts may be especially difficult in the harsh environment in which airborne or space vehicles operate.

In contrast to other free space optical communication systems, a terminal according to the techniques of this disclosure may be selectable to operate either as an A terminal or as a B terminal while maintaining a stable optical path, e.g., with no moving parts, such as mechanical switching. The terminal of this disclosure may be used for either configuration A or B. The terminal of this disclosure may provide advantages including simplified inventory management and enable the ability to change the pairing of terminals in-flight as needed. In other words, a terminal of this disclosure may communicate with either an A or B configured terminal rather than being limited to only being able to communicate with one type. Said in another way, the selectable terminal of this disclosure may provide an advantage to enable tunable operation of the terminal while in flight, without having to use moving parts in the free space optical train. In addition, the terminal according to this disclosure may include polarization maintaining operation.

FIG. 1 is a block diagram illustrating an example optical communication system according to one or more techniques of this disclosure. System 100 may also be described as a communication terminal and may be one of many such terminals that communicate with each other. In some examples, system 100 may be installed in a spacecraft, e.g., a free space optical terminal, in a ground station, in an airborne craft, e.g., a balloon, an aircraft and so on. System 100 may be selectable to operate in either configuration A or B while maintaining a stable optical path.

In the example of FIG. 1, system 100 includes a transceiver 104 with a first light coupling port 124 and a second light coupling port 126, automated tracking system 106, coarse steering and telescope unit 102, and a fine steering unit 103. Fine steering unit 103 includes a first dichroic reflector 120 and a second dichroic reflector 122, light dumps 118 and 119, optical transmission lines 110 and 112, and two fast steering mirrors: pointing module 114 and fine steering module (FSM) 116.

Coarse pointing and fine tracking functions in system 100 may be realized through separate units because the range of motion, resolution, and speed of adjustments may be quite different between coarse pointing (e.g., large field of regard, relatively slow and infrequent movements) and fine tracking (e.g., small range of motion at higher speed with small adjustments being made continuously). Fine tracking functions may also include pointing ahead or behind functions that may keep the optical signals traveling between the two communicating terminals properly aligned when traveling at very fast relative speeds.

Coarse steering and telescope unit 102 may include a telescope to adapt the light beam properties for long distance propagation and tracking, and may also include pointing assemblies to aim the light beam between communicating terminals and lock the communication path in the presence of mechanical or optical disturbances, e.g., mechanical jitter of the terminal's platforms or atmospheric beam deflections, etc. As in the example of FIG. 1, coarse pointing is usually done on the larger optical beam after the telescope since otherwise the required field of view of the telescope may be large and the optics complexity and cost would be high. The fine pointing may be done before the telescope, as in the example of FIG. 1, where the beam is small and therefore fast steering mirrors used for fine tracking can be made small and low inertia to maximize control speed. For the same reason, the fine steering assembly, e.g., fine steering unit 103, is where the wavelength separation between the receive and transmit beams occur in the example of system 100.

FSM 116 is a fast steering mirror, which is hardware installed as part of fine steering unit 103, and may include actuators, such as motors, to adjust the mirrors, processing circuitry to receive feedback signals from automated tracking system 106 and to control the actuators. FSM 116 may receive control inputs from automated tracking system 106, also referred to as ATS 106 in this disclosure. Automated tracking system 106 may receive a portion of the return signal, e.g., a return signal received from a different terminal on another space craft, ground station, etc. Automated tracking system 106 may ensure proper alignment of the light beam and close the loop with FSM 116.

Pointing module 114 is also a fast steering mirror that may perform a point ahead or point behind function, depending on whether system 100 is operating in the first operating mode, e.g., A-type terminal configuration, or the second operating mode, e.g., B-type terminal configuration. Pointing module 114, in the example of system 100, is used to compensate for relative motion of the two terminals given the finite time-of-flight of light between transmit and receive.

Transceiver 104 may be a transceiver unit that is configured to convert signals from electrical to optical and from optical to electrical. That is, transceiver 104 may convert a communication signal from electrical to optical and output the optical signal via fine steering unit 103 and coarse steering and telescope unit 102. Transceiver 104 may also receive optical communication signals from other terminals, e.g., from other spacecraft, ground stations etc. Transceiver 104 may receive the optical communication signals via coarse steering and telescope unit 102 and fine steering unit 103. Transceiver 104 may output or receive communication signals using either light coupling port 124 or 126. Light coupling ports 124 and 126 connect transceiver 104 to fine steering unit 103.

Fine steering unit 103 also includes two dichroic reflectors 120 and 122 with modified filtering ratios to be used in conjunction with each other. Dichroic reflectors 120 and 122 may provide both wavelength separation functions and power splitting functions. Dichroic reflectors 120 and 122 may also be referred to as a dichroic filter or a dichroic mirror in this disclosure. A dichroic reflector may reflect all or a portion of a first wavelength while allowing all or a portion of a second wavelength to pass. The first dichroic reflector 120 and the second dichroic reflector 122 are of the same type. That is, both of dichroic reflector 120 and dichroic reflector 122 are configured to substantially reflect a first wavelength and pass a second wavelength. The modified filtering ratios of each of dichroic reflector 120 and dichroic reflector 122 mean that each dichroic reflector is configured to substantially pass the second wavelength ($\lambda$B), reflect a portion of the second wavelength, and reflect the first wavelength ($\lambda$A) and pass a portion of the first wavelength. In this disclosure, "substantially" means more than 90% of the wavelength. In some examples, each of dichroic reflector 120 and dichroic reflector 122 may reflect 99% of $\lambda$A and pass 1% leakage through of $\lambda$A. Similarly, each dichroic reflector 120 and 122 may be configured for 99% transmission of $\lambda$B and 1% leakage reflected of $\lambda$B. In other words, the dichroic reflectors of this disclosure, e.g., dichroic reflector 120 and dichroic reflector 122, may be intentionally modified to both reflect and pass a first wavelength and pass and reflect a second wavelength.

Light dumps 118 and 119 are arranged in the example of system 100 to receive leakage through dichroic reflector 120 and dichroic reflector 122, respectively. Light dumps 118 and 119 may each include a light absorbing material that may reduce or prevent extraneous light from interfering with the signals in other parts of fine steering unit 103.

In contrast to fine steering unit 103 of system 100, other examples of fine steering units may only operate in one operational mode as a fixed terminal type. In this disclosure a fine steering unit may also be referred to as a fine tracking unit. Such a fixed terminal type may include a beam splitter instead of the second dichroic reflector 122 of system 100. The beam splitter of a fixed type of terminal may ensure proper alignment of the light beam and close the loop with a fine steering module, e.g., a fast steering mirror. The transceiver of the fixed type terminal may have one light coupling port configured only to transmit optical communication signal at a first wavelength and a second light coupling port configured only to receive optical communication signals at a second wavelength, e.g., a fixed A-configured terminal. The fixed A-configured terminal may be configured to only communicate with a B-configured terminal. In contrast, fine steering unit 103 may be selectable to operate either as an A terminal or as a B terminal. Optical transmission lines 110 and 112 of fine steering unit 103 of this disclosure may remain stable optical paths, e.g., with no moving parts, such as mechanically switching components into or out of the optical path.

Figure 2A:
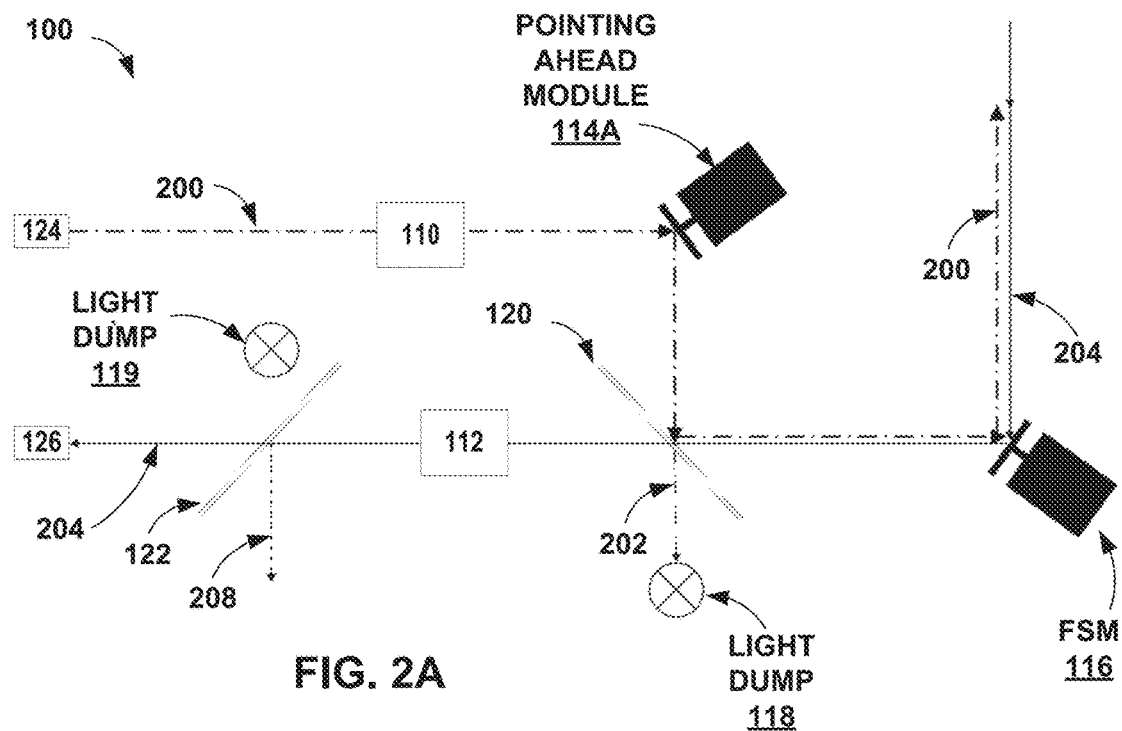
FIG. 2A is a block diagram illustrating an example operation of the optical communication system of this disclosure in a first operational mode.
Figure 2B:
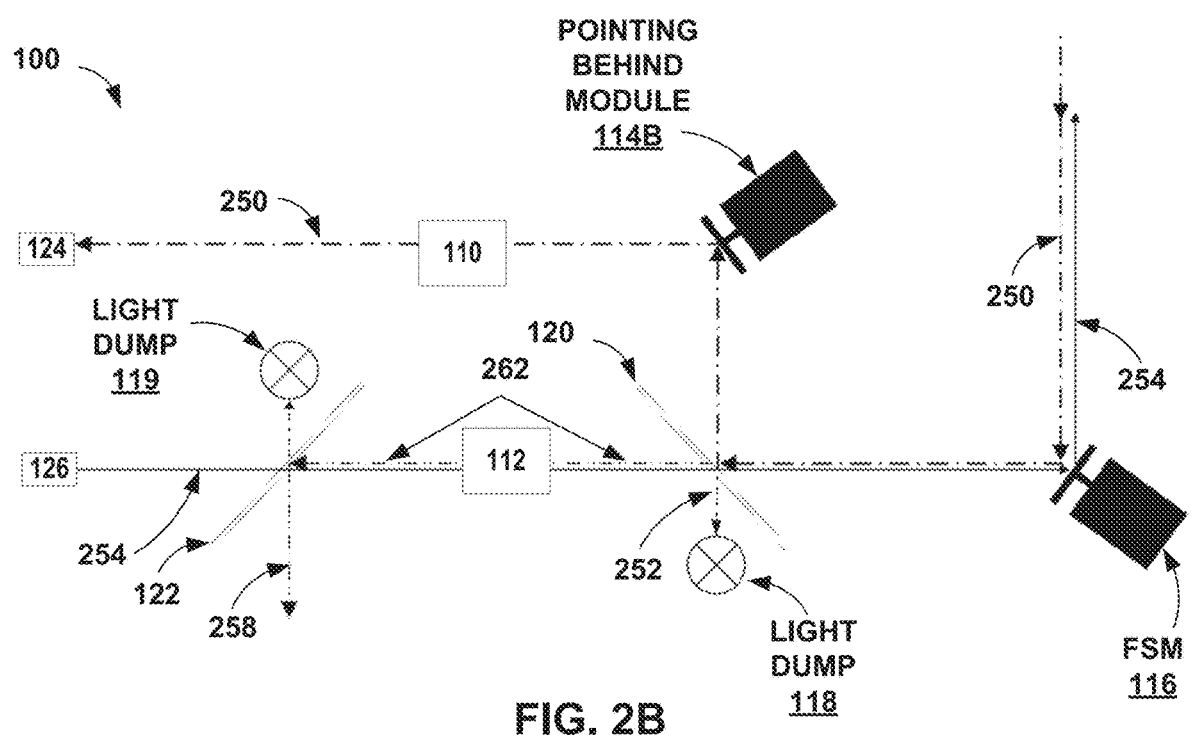
FIG. 2B is a block diagram illustrating an example operation of the optical communication system of this disclosure in a second operational mode.

FIG. 2A is a block diagram illustrating an example operation of the optical communication system of this disclosure in a first operational mode. System 100 in the example of FIGS. 2A and 2B is an example of system 100 described above in relation to FIG. 1 and may have the same functions and characteristics. For example, system 100 shown in FIGS. 2A and 2B may provide wavelength separated operation with no mechanical switching of optical elements in the light path. Some components of system 100 have been omitted from FIGS. 2A and 2B for clarity and to simplify the description.

In operations, a first fiber, optical transmission line 110, is associated with wavelength A and a second fiber, optical transmission line 112, with wavelength B. As described above in relation to FIG. 1, a pair of electrically selectable transponders, e.g., within transceiver 104, may connect to fine steering unit 103 via light coupling ports 124 and 126. FIG. 2A depicts operation of system 100 in the first mode of operation, which may also be described as configuration A in this disclosure. In the example of FIG. 2A, light coupling port 124 is configured as the transmit side, e.g., with transponder A of transceiver 104 set to transmit. Light coupling port 126 is configured as the receive side, e.g., with transponder B of transceiver 104 set to receive.

In configuration A of FIG. 2A, transmit wavelength λA 200 from light coupling port 124 travels through optical transmission line 110 and reaches a first fast steering mirror used as a point ahead module 114A. After being directed by the mirrors of point ahead module 114A, transmit wavelength λA 200 reaches the first dichroic reflector 120, which may substantially reflect transmit wavelength λA 200 and pass a portion 202 of transmit wavelength λA to light dump 118. In some examples, dichroic reflector 120 may reflect approximately 99% of transmit wavelength λA 200 to the second fast steering mirror, which is acting as a fast steering module, FSM 116. After being directed by the mirrors of FSM 116, transmit wavelength λA 200 may exit the fine steering unit of system 100 to proceed with the rest of the optical train, e.g., coarse steering and telescope unit 102 described above in relation to FIG. 1. In other words, while the fine steering unit of system 100 is in a first operational mode, the first dichroic reflector 120 is configured to substantially reflect a first outgoing signal at the transmit wavelength λA 200 from the first light coupling port 124 to FSM 116.

As described above in relation to FIG. 1, the components of system 100 may direct the outgoing signal at the transmit wavelength λA 200 to a receiving terminal, for example, on a satellite or other spacecraft. The receiving terminal may also transmit optical signals at wavelength λB back to system 100, e.g., while operating with duplex communication.

When receiving a signal at receive wavelength λB 204, FSM 116 first redirects the beam of the received signal to the first dichroic reflector 120. In the example of system 100, dichroic reflector 120 is configured to pass the second wavelength, e.g., the received signal at receive wavelength λB 204. The received signal may also be referred to as the incoming signal at receive wavelength λB 204. In some examples, receive wavelength λB 204 may pass through the first dichroic reflector 120 at approximately 99% transmission along optical transmission line 112 to the second dichroic reflector 122. As noted above, a dichroic reflector may also be referred to as a dichroic mirror, or a dichroic filter in this disclosure. Because dichroic reflector 122 is of the same type as dichroic reflector 120, dichroic reflector 120 may also substantially pass the first incoming signal 204 at the second wavelength λB from the first dichroic reflector 120 to second light coupling port 126. Dichroic reflector 122 may reflect a portion 208 of the first incoming signal at the second wavelength λB 204 from the first dichroic reflector 120. As described above in relation to FIG. 1, portion 208 may be considered small leakage, e.g., approximately 1%, and dichroic reflector 122 may reflect portion 208 towards the ATS 106 to enable closed loop control of the second fast steering mirror, FSM 116.

The term "leakage" in this disclosure may be used to indicate optical energy at a first wavelength that passes through a dichroic reflector configured to substantially reflect the first wavelength. That is, the dichroic reflector may reflect most of the optical energy at the first wavelength, and "leak" a portion through the dichroic reflector. Also, as in the example of portion 208, "leakage" may refer to optical energy a second wavelength that reflects from a dichroic reflector when that dichroic reflector is configured to substantially pass the second wavelength. Said another way, the dichroic reflector may pass most of the optical energy at the second wavelength and "leak" a portion that reflects from the dichroic reflector.

System 100 may provide wavelength separation to isolate the outgoing and incoming signals, which during duplex communication, may be present simultaneously at the components of system 100. Backscattering at the transmit wavelength λA 200 may have to leak twice through both dichroic reflector 120 and dichroic reflector 122 before reaching the second light coupling port 126 connected to the receiver. As such, in some examples any backscattered light may be attenuated by approximately 40 dB (1% of 1%). In some examples, system 100 may control back reflection at the coarse steering and telescope unit 102 to within −40/−45 dB, therefore the total isolation between transmit and receive is 80/85 dB (e.g., controlled back scattering of ~40 dB plus leakage through two dichroic reflectors to total ~40 dB). As described above, incoming signal 204 may be much weaker than the transmitted outgoing signal 200, and isolation between transmit and receive may be desirable to preserve communication integrity.

FIG. 2B is a block diagram illustrating an example operation of the optical communication system of this disclosure in a second operational mode. The example of FIG. 2B is vice-versa arrangement for configuration B when compared to FIG. 2A described above. In the example of FIG. 2B, light coupling port 126 is configured as the transmit side, e.g., with transponder B (not shown in FIG. 1) of transceiver 104 set to transmit. Light coupling port 124 is configured as the receive side, e.g., with transponder A of transceiver 104 set to receive. The operation of transceiver 104 in the second mode of operation may also be described as turning ON the transmit side of transponder B and turning ON the received side of transponder A while turning OFF the receive side of transponder B and turning OFF the transmit side of transponder A.

In reverse configuration B, the outgoing signal at transmit wavelength λB 254 from light coupling port 126 travels through the second fiber, optical transmission line 112, and passes mostly unaffected through second dichroic reflector 122 and first dichroic reflector 120. The second fast steering mirror, FSM 116, may then reflect transmit wavelength λB 254 towards coarse steering and telescope unit 102, as described above in relation to FIG. 1.

FSM 116 may reflect the incoming signal at received wavelength λA 250 to dichroic reflector 120. Dichroic reflector 120 may substantially reflect the incoming signal at wavelength λA 250 from FSM 116 to the first light coupling port 124 via the pointing module, which in configuration B functions as point behind module 114B. Similar to the description of pointing module 114 and point ahead module 114A described above in relation to FIGS. 1 and 2A, point behind module 114B is the same fast steering mirror, which is now configured as the inverse function to that of a point-ahead module. Point behind module 114B still corrects the receive path from mispointing caused by finite time-of-flight of the light beam between transmit and receive in the case of fast moving terminals.

Dichroic reflector 120 may also pass a portion 262 of the received incoming signal at wavelength λA 250 to the second dichroic reflector 122. In some examples, approximately a 1% portion 262 of received signal at λA 250 leaks through first dichroic reflector 120 and is then reflected 258 off the second dichroic reflector 122 to reach ATS 106 depicted in FIG. 1, thereby providing feedback to close the control loop of FSM 116.

In contrast to configuration A, for configuration B, back-reflected transmit signal of wavelength λB 254 may be reflected at approximately 1% by dichroic reflector 120 before reaching point behind module 114B and traveling along the first fiber of optical transmission line 110 to light coupling port 124 connected to the receiver, e.g., transceiver 104. In the second operational mode, transmit signal of wavelength λB 254 is much higher in amplitude than received signal 250. In some examples, the total isolation between transmit and receive in "B" type configuration may only be approximately −60/−65 dB when back reflection is controlled to less than −40/−45 dB at coarse steering and telescope unit 102. To achieve an isolation of approximately 70 dB, which may be desirable to cover the longest link range (highest diffraction losses) between to communicating terminals, then to control back-reflection in the second operational mode, e.g., configuration B, system 100 may be arranged to control back reflection to below −50 dB.

In some examples, leakage of the transmit signal onto the automatic tracking system, e.g., ATS 106, in both "A" type and "B" type configurations may be of the order of −60/−65 dB, since a back-reflected transmit signal would only have to leak once through respectively the first dichroic filter reflector 120 or the second dichroic reflector 122 to reach the ATS sensor. This level of cross-talk may be tolerable during sequential acquisition procedures when transmit signals would be turned on and off alternatively between the pair of terminals during acquisition, or in the case of beacon signal based acquisition and tracking. However, isolation of less than approximately 70 dB may be insufficient for a terminal locking onto the received signal during duplex operation. During duplex communication, an additional level of isolation may be desirable. In some examples, increased isolation may be provided through additional filtering or use of polarization splitting.

Figure 3:
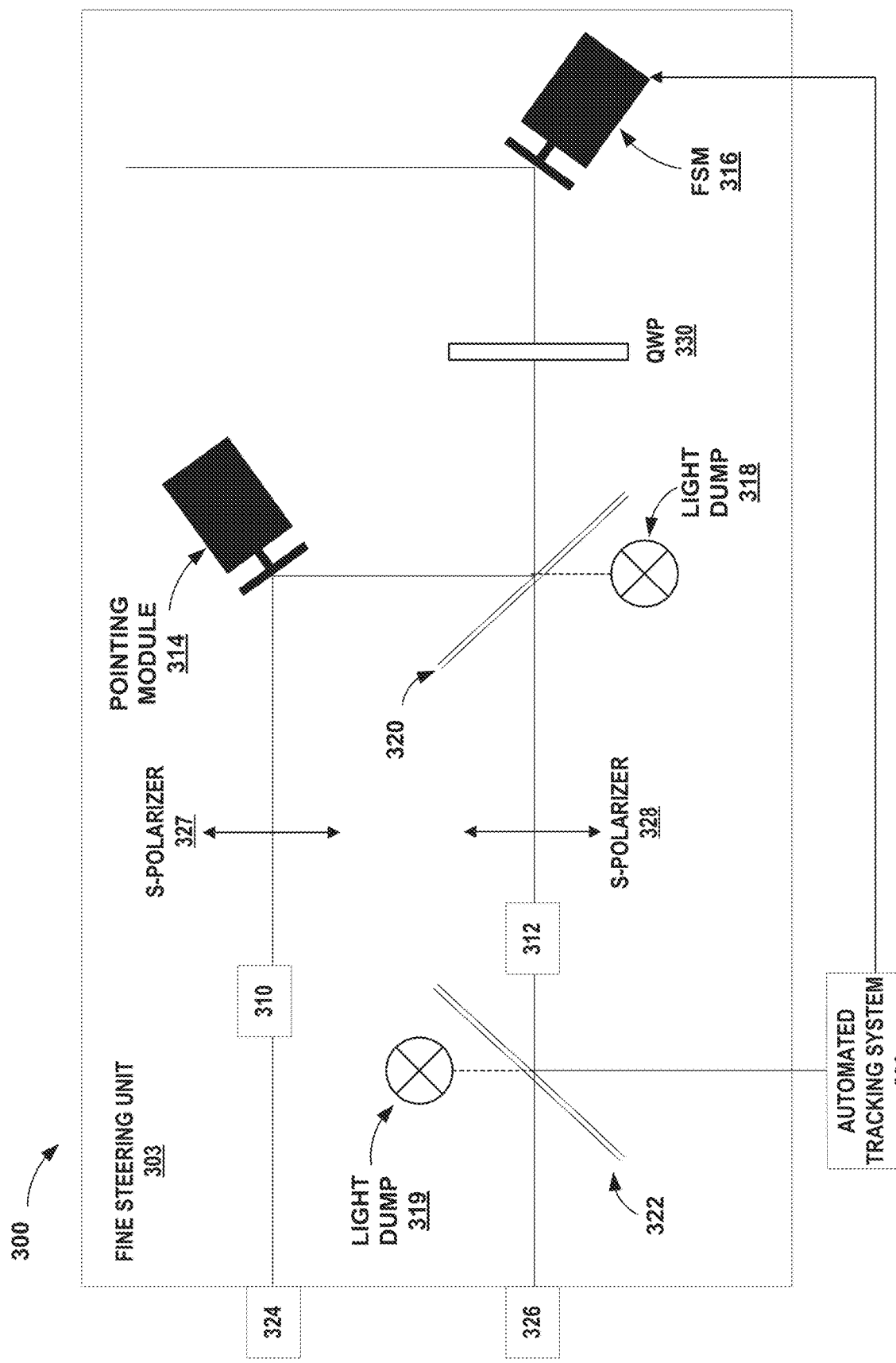
FIG. 3 is a block diagram illustrating an example of a polarized wavelength separated fine steering unit of an optical communication system according to one or more techniques of this disclosure.

FIG. 3 is a block diagram illustrating an example of a polarized wavelength separated fine steering unit of an optical communication system according to one or more techniques of this disclosure. System 300 is an example of system 100 described above in relation to FIGS. 1-2B, with the addition of polarization control elements, which may improve isolation between outgoing transmit signals and incoming receive signals. Specifically, the example of system 300 includes: first light coupling port 324, second light coupling port 326, automated tracking system 306, and fine steering unit 303, which are, respectively, examples of light coupling port 124, light coupling port 126, automated tracking system 106, and fine steering unit 103 described above in relation to FIG. 1. Fine steering unit 303 includes first dichroic reflector 320, second dichroic reflector 322, light dumps 318 and 319, optical transmission lines 310 and 312, and two fast steering mirrors: pointing module 314 and fine steering module 316. System 300 may also include coarse steering and telescope unit (not shown in FIG. 3). The characteristics and functions of first light coupling port 324, second light coupling port 326, automated tracking system 306, and fine steering unit 303 may be similar or the same as the characteristics and functions of, respectively, light coupling port 124, light coupling port 126, automated tracking system 106, and fine steering unit 103 of FIG. 1. In this disclosure, fine steering unit 303 may also be referred to as a polarized wavelength separated fine steering unit.

In the example of system 300, first polarization control element 327 ("s-polarizer 327") is placed between first light coupling port 324 and first dichroic reflector 320. Second polarization control element 328 ("s-polarizer 328") is placed between the first dichroic reflector 320 reflector and the second dichroic reflector 322. A polarization control element may also be referred to as a polarizer in this disclosure, e.g., an s-polarizer or a p-polarizer.

The directions of polarization, e.g., s-polarization and p-polarization, may refer to the plane in which the electric field of a light wave oscillates. In some conventions, p-polarized light is understood to have an electric field direction parallel to the plane of incidence on a device, and s-polarized light has an electric field oriented perpendicular to that plane. The nomenclature "s" and "p" originate from the German terms "senkrecht," meaning perpendicular, and "parallel," which means the same in German as in English. In general, s-polarizers 327 and 328 introduced into the two arms of fine steering unit 303 may act as beam cleaners to differentiate between back-reflected light and the transmitted or received signals. Quarter-wave plate (QWP) 330 is located between dichroic reflector 320 and FSM 316, e.g., prior to the telescope/coarse pointing assembly.

In the example of system 300, QWP 330 may be configured to transform the s-polarization state of signals into a left-handed circular polarization (LHCP). In other examples, QWP 330 may be configured to transform signals to right-handed circular polarization (RHCP) and s-polarizers 327 and 328 are configured to filter polarization in the p-direction. In other examples, QWP 330 may be located between FSM 316 and the coarse pointing and telescope unit, or in other locations (not shown in FIG. 3). In other examples, system 300 may also include more than one QWP.

Figure 4A:
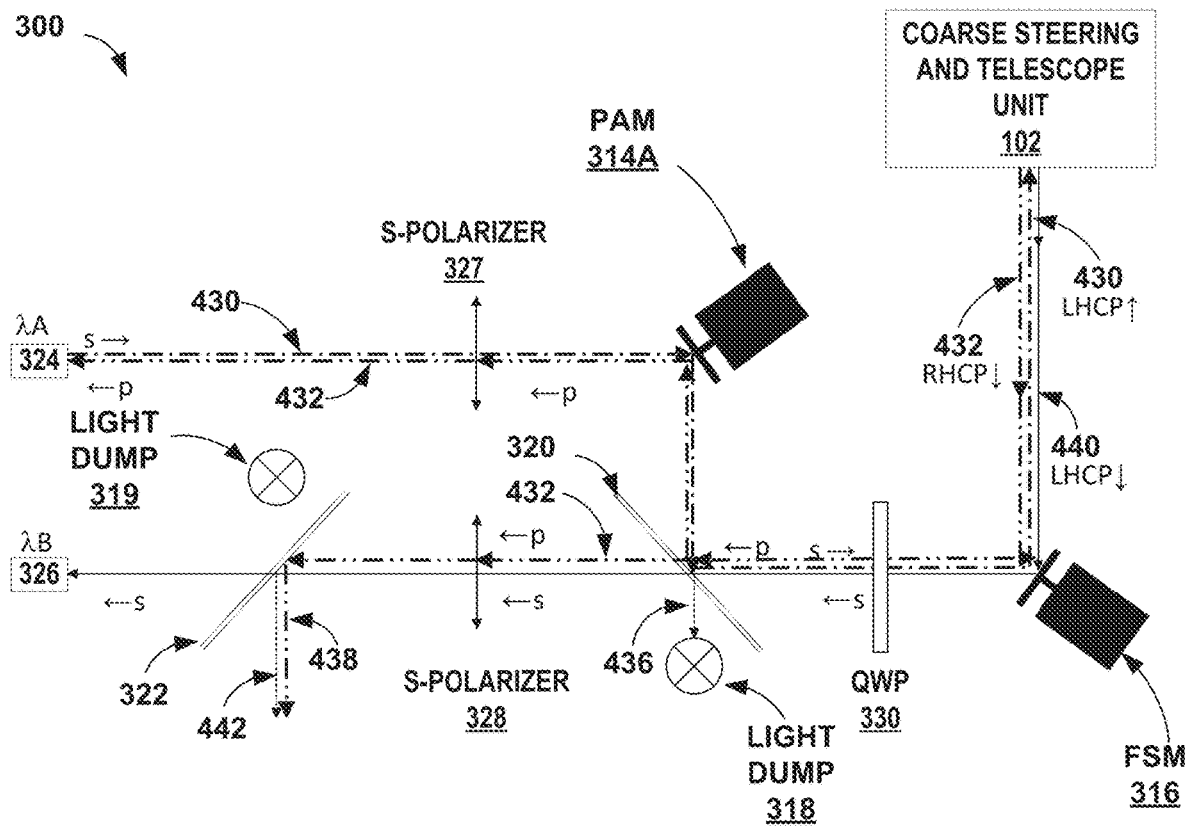
FIG. 4A is a block diagram illustrating an example operation of the optical communication system with polarization control in a first operational mode.

FIG. 4A is a block diagram illustrating an example operation of the optical communication system with polarization control of this disclosure in a first operational mode, e.g., configuration A. In configuration A, outgoing transmit signal 430 at λA wavelength from light coupling port 324 travels along the first optical transmission lines 310 in s-polarization, and therefore goes through s-polarizer 327 unaffected. Outgoing transmit signal 430 reflects off the first fast steering mirror, PAM 314A, acting as a point ahead module (PAM) as described above in relation to FIGS. 1-2A. Dichroic reflector 320 substantially reflects outgoing signal 430 at wavelength λA to fine steering module, FSM 316 through QWP 330. Dichroic reflector 320 may pass portion 436 to light dump 318. In this disclosure, an outgoing signal or incoming signal may also be referred to as an incoming beam or outgoing beam, e.g., outgoing transmit beam 430 is equivalent to outgoing transmit signal 430.

QWP 330 transforms outgoing signal 430 into LHCP polarization. FSM 316 directs outgoing signal 430 into the coarse steering and telescope unit 102, described above in relation to FIG. 1. Any back-reflected light 432 ("back-reflected signal 432") may return from coarse steering and telescope unit 102 in opposite circular polarization handedness, which is RHCP in the example of system 300. FSM 316 may direct back-reflected signal 432 towards light coupling port 326 and ATS 306 described above in relation to FIG. 3. QWP 330 may transform back-reflected signal 432 into p-polarization. However, the presence of second s-polarizer 328, which is orthogonal to the p-polarization, may suppress back-reflected signal 432, which in some examples may be suppressed by approximately 30 dB to 60 dB and may depend on the polarizer used to implement s-polarizer 328. In this manner, both the back-reflection suppression level at light coupling port 326 and reflected 438 to the sensor for ATS 306 may provide sufficient isolation for duplex communication. In some examples, when components of system 300 manage the back reflection (BR) to below −40 dB/−45 dB, the suppression at light coupling port 326 may be on the order of −80 dB+BR and at the sensor for ATS 306 may be on the order of −60 dB+BR. Similarly, s-polarizer 327 may suppress back-reflected signal 432 reflected toward light coupling port 324 via dichroic reflector 320 and PAM 314A.

Also, while in configuration A, the received signal at wavelength λB 440 coming from a paired communication terminal, e.g., a ground station, a spacecraft, etc., may be LHCP polarized. Therefore, after FSM 316 directs received signal 440 through QWP 330, QWP 330 transforms received signal 440 into s-polarized light, which can therefore pass through s-polarizer 328 substantially unaffected. Second dichroic reflector 322 may be configured to substantially pass the incoming received signal 440 at wavelength λB from dichroic reflector 320 to the second light coupling port 326 along optical transmission line 312. Dichroic reflector 322 may reflect a portion 442 of incoming received signal 440 toward ATS to provide closed loop feedback for FSM 316. Similar to system 100, described above in relation to FIG. 1, in some examples, dichroic reflector 322 may pass approximately 99% of received signal 440 at wavelength λB and reflect a small, e.g., approximately 1% leakage, toward ATS 306.

Figure 4B:
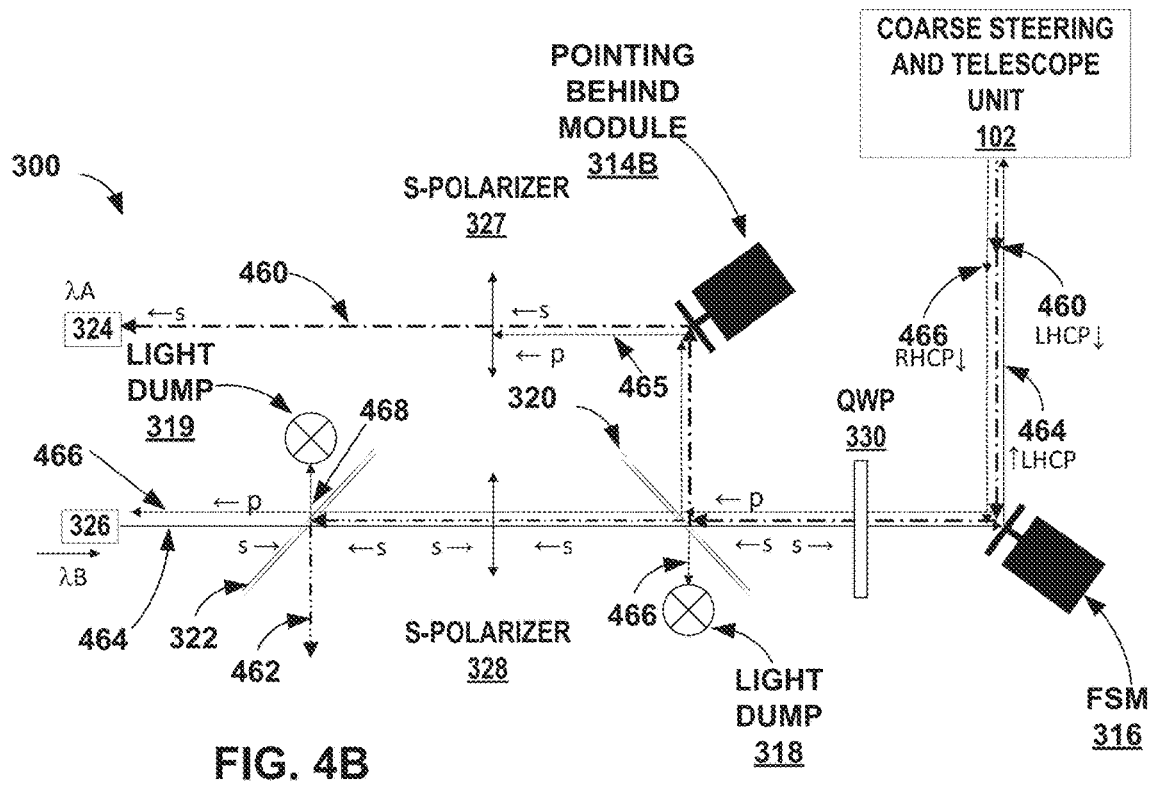
FIG. 4B is a block diagram illustrating an operation of the optical communication system with polarization control in a second operational mode.

FIG. 4B is a block diagram illustrating an example operation of the optical communication system with polarization control of this disclosure in a second operational mode, e.g., in the reverse configuration of FIG. 4A. In other words, the example of FIG. 4B illustrates system 300 in configuration B. Light coupling port 326 connects outgoing transmit signal 464 at wavelength λB through the second optical transmission line 312. Outgoing transmit signal 464 may pass through second dichroic reflector 322, second s-polarizer 328, and first dichroic reflector 320 substantially unaffected. As described above in relation to FIG. 4A, s-polarizer 328 may pass optical signals with s-polarization and attenuate signals with p-polarization. As described above in relation to FIG. 1, dichroic reflector 322 and dichroic reflector 320 may be configured to substantially pass signals with wavelength λB and substantially reflect optical signals with wavelength λA. In some examples, "substantially pass" means to pass approximately 99% of wavelength λB, with leakage 468 of approximately 1% reflected from dichroic reflector 322 to light dump 319. Similarly, dichroic reflector 320 may pass approximately 99% of wavelength λB and reflect leakage (back-reflected signal 466) of approximately 1% of wavelength λB to light dump 318.

After passing through dichroic reflector 320, QWP 330 may transform outgoing transmit signal 464 into LHCP polarization. FSM 316 may redirect outgoing transmit signal 464 towards coarse steering and telescope unit 102.

Incoming receive signal 460 at wavelength λA, may be received from the paired terminal by coarse steering and telescope unit 102 in LHCP polarization state. FSM 316 may reflect incoming signal 460 toward QWP 330, which may transform incoming signal 460 into s-polarization. Because incoming signal 460 is at wavelength λA, dichroic reflector 320 may substantially reflect incoming signal 460 to pointing behind module 314B. From pointing behind module 314B, incoming signal 460 may pass through s-polarizer 327 substantially unaffected along polarization maintaining fiber, e.g., optical transmission line 310 to light coupling port 324 connected to the receiver, e.g., transceiver 104 described above in relation to FIG. 1.

A portion 462 of the λA incoming signal 460 leaks through the dichroic reflector 320 and continues towards s-polarizer 328. Because QWP 330 transformed incoming signal 460 into s-polarization state, portion 462 goes through s-polarizer 328 unaffected and dichroic reflector 322 substantially reflects portion 462 at wavelength λA toward ATS 306, where ATS uses portion 462 to provides a feedback signal to close the tracking loop for FSM 316.

Back-reflected signal 466 transmit light at λB is reflected back into the unit in orthogonal circular handedness from outgoing signal 464. In the example of system 300, because outgoing signal 464 is LHCP, the back-reflected orthogonal signal is RHCP. FSM 316 reflects back-reflected signal 466, and QWP 330 transforms back-reflected signal 466 into a p-polarized state. Because p-polarized back-reflected signal 466 is at wavelength λB, back-reflected signal 466 may substantially pass through dichroic reflector 320 but then be blocked by second s-polarizer 328. As described above in relation to FIG. 4A, s-polarizer 328 may substantially attenuate back-reflected signal 466 by approximately 40 dB and in some examples in the range of approximately 30-60 dB. Because back-reflected signal 466 is of the second wavelength λB, dichroic reflector 322 may be configured to only reflect approximately 1% of the attenuated back-reflected signal 466 to the automated tracking system, ATS 306. Therefore, in some examples, the total isolation between transmitted outgoing signal and ATS 306 may be is on the order of 100 dB/105 dB, based on 20 dB (dichroic reflector 322)+40 dB (s-polarizer 328)+40/45 dB (back-reflection control level at coarse steering and telescope unit 102). Therefore, back-reflected signal 466 for system 300 in configuration B may be substantially attenuated and have little to no effect on the closed loop feedback for FSM 316.

Dichroic reflector 320 may reflect a leakage portion 465, e.g., in some examples approximately 1% of p-polarized back-reflected signal 466 at λB from FSM 316. Leakage portion 465 may travel to and reflect from pointing behind module 314B and reaches s-polarizer 327. S-polarizer 327 may attenuate leakage portion 465 of back-reflected signal 466 by approximately 40 dB, as described above for s-polarizer 328. Therefore, the total isolation between transmit and receive, e.g., transmitted from light coupling port 326, and the back-reflection received at light coupling port 324, may be also on the order of approximately 100 dB/105 dB based on 20 dB (e.g., 1% reflection from dichroic reflector 320)+40 dB (e.g., attenuation from s-polarizer 327)+40/45 dB (back-reflection level from coarse steering and telescope unit 102).

Figure 5:
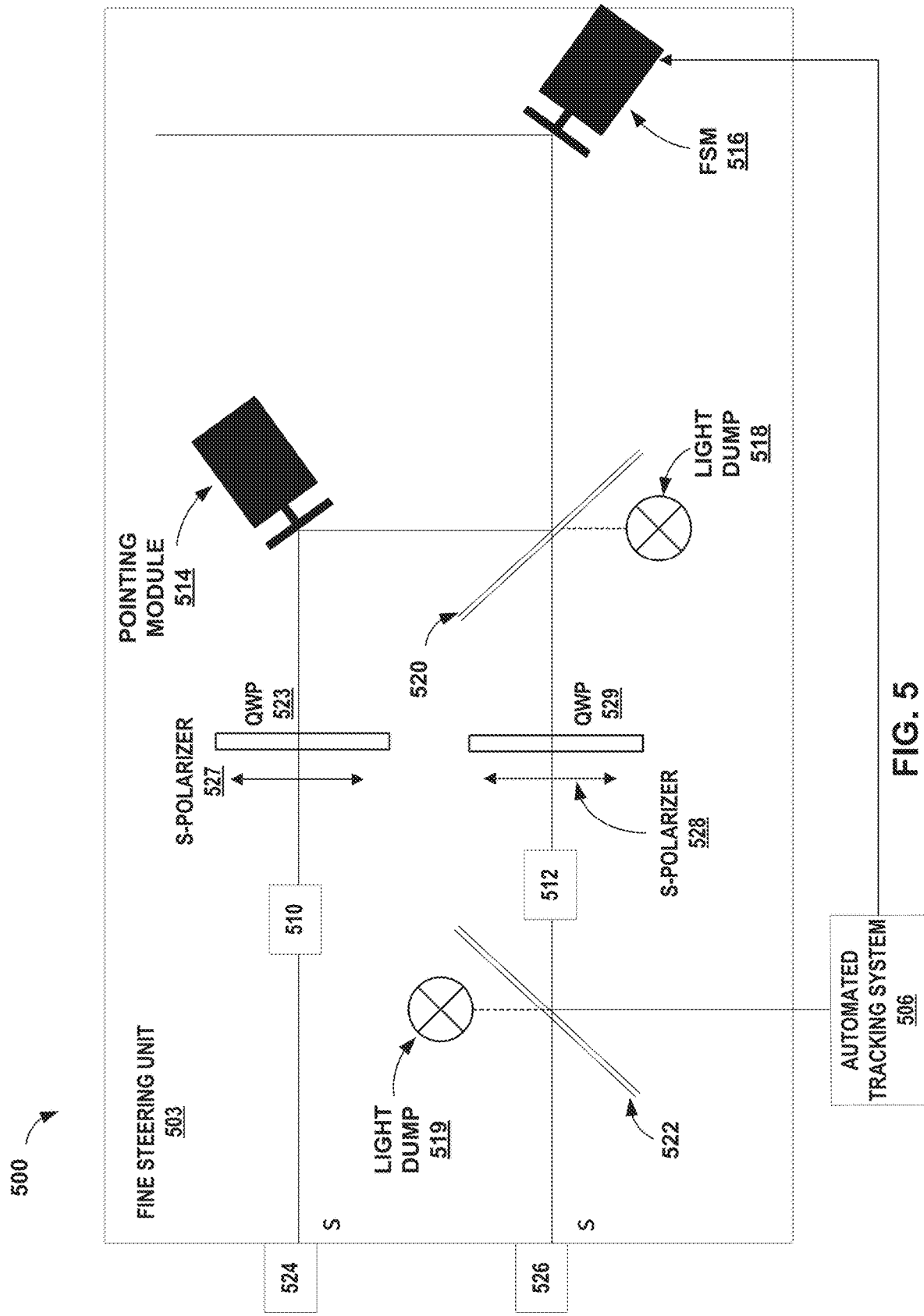
FIG. 5 is a block diagram illustrating an alternative optical communication system with polarization control elements according to one or more techniques of this disclosure.

FIG. 5 is a block diagram illustrating an alternative optical communication system with polarization control elements according to one or more techniques of this disclosure. System 500 is an example of systems 100 and 300 described above in relation to FIGS. 1 and 3. The functions and characteristics of the components of system 500 may be the same or similar to the functions and characteristics of components described above for systems 100 and 300.

The example of system 500 includes: first light coupling port 524, second light coupling port 526, automated tracking system 506, and fine steering unit 503. Fine steering unit 503 includes first dichroic reflector 520, second dichroic reflector 522, light dumps 518 and 519, optical transmission lines 510 and 512, and two fast steering mirrors: pointing module 514 and fine steering module 516. As described above in relation to FIG. 3, optical transmission lines 510 and 512 may be configured for s-polarization. In other examples, optical transmission lines 510 and 512 may be configured for p-polarization.

System 500 depicts alternative placements of the polarizing elements when compared to system 300. For example, in the arrangement of system 500, two QWPs, QWP 523 and 529, each placed inside the arms of the fine steering unit 503, replace the QWP 330 of system 300. QWP 523 is located on optical transmission line 510 between pointing module 514 and s-polarizer 527. Therefore, an outgoing transmit signal from light coupling port 524 would pass along optical transmission line 510, through s-polarizer 527, and QWP 523 before being redirected by pointing module 514. Similarly, QWP 529 is located on optical transmission line 512 between dichroic reflector 520 and s-polarizer 528. Therefore, an outgoing transmit signal, e.g., of wavelength λB, from light coupling port 526 would pass along optical transmission line 512, through dichroic reflector 522, through s-polarizer 528, QWP 529, and dichroic reflector 520 before being redirected by FSM 516.

As compared to the configuration of system 300, the arrangement of system 500 may provide additional back-reflection immunity against potential back-reflection from first and second fast steering mirrors, pointing module 514 and FSM 516, dichroic reflector 520, and light dump 518. In some examples, a combined polarizer/QWP assembly, e.g., a single component comprising s-polarizer 527 and QWP 523, may make the arrangement of system 500 more compact.

Figure 6A:
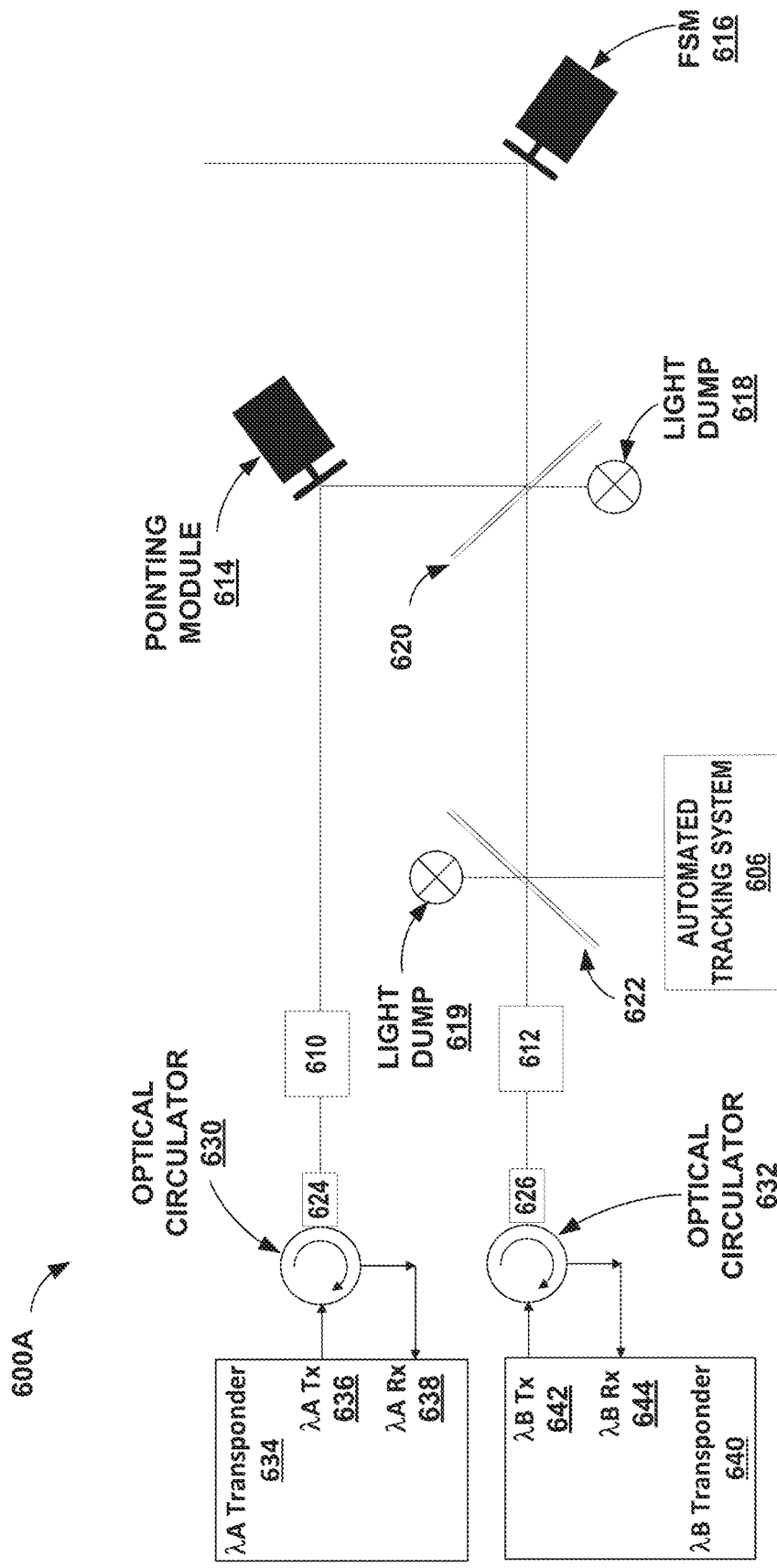
FIG. 6A is a block diagram illustrating an example optical communication system with optical circulators configured to connect transponders according to one or more techniques of this disclosure.

FIG. 6A is a block diagram illustrating an example optical communication system with optical circulators configured to connect the transponders according to one or more techniques of this disclosure. System 600A is an example of systems 100, 300 and 500 described above in relation to FIGS. 1-3. The functions and characteristics of the components of system 600A may be the same or similar to the functions and characteristics of components described above for systems 100, 300 and 500. Also, optical circulators 630 and 632, as well as transponders 634 and 640 may be applied to any of systems 100, 300 and 500 described above in relation to FIGS. 1-5. Together, transponders 634 and 640 may be considered a transceiver, similar to transceiver 104 described above in relation to FIG. 1.

The example of system 600A includes: first light coupling port 624, second light coupling port 626, automated tracking system 606, and a fine steering unit including first dichroic reflector 620, second dichroic reflector 622, light dumps 618 and 619, optical transmission lines 610 and 612, and two fast steering mirrors: pointing module 614 and fine steering module 616.

Transponder 634 may be configured to convert electrical communication signals (not shown on FIG. 6A) from electrical to optical and from optical to electrical for a first wavelength, e.g., λA. Transponder 634 may include a transmit port 636 (Tx 636) and a receive port 638 (Rx 638). When transponder 634 is configured to transmit, e.g., in a first operational mode, the outgoing transmit signal may travel from transmit port 636 to optical circulator 630 where light coupling port 624 connects the outgoing transmit signal to optical transmission line 610. When system 600A is operating in the second operational mode, e.g., configuration B, communication signals at wavelength λA received from another terminal via the telescope and coarse steering unit (not shown in FIG. 6A) may enter light coupling port 624 via FSM 616, dichroic reflector 620, and pointing module 614, which may operate as a pointing behind module in configuration B. Optical circulator 630 may couple the received incoming optical signal to receive port 638, for further amplification, filtering, conversion to an electrical signal and so on.

Similarly, transponder 640 may be configured to convert electrical communication signals from electrical to optical and from optical to electrical for a second wavelength, e.g., λB. Transponder 640 may include a transmit port 642 (Tx 642) and a receive port 644 (Rx 644). When transponder 640 is configured to transmit, e.g., in a second operational mode, the outgoing transmit signal may travel from transmit port 642 to optical circulator 632 where light coupling port 626 connects the outgoing transmit signal to optical transmission line 612. When system 600A is operating in the first operational mode, e.g., configuration A, communication signals at wavelength λB received from another terminal via the telescope and coarse steering unit may enter light coupling port 626 via FSM 616, dichroic reflector 620, and dichroic reflector 622. Optical circulator 632 may couple the received incoming optical signal to receive port 644, for further amplification, filtering, conversion to an electrical signal and/or other signal processing.

As described above in relation to FIG. 2B, in the second operational mode, light coupling port 626 is configured as the transmit side, e.g., with transponder 640 set to transmit. Also, in in the second operational mode, light coupling port 624 is configured as the receive side, e.g., with transponder 634 set to receive. The operation of system 600A in the second mode of operation may also be described as turning ON the transmit side of transponder 640 and turning ON the receive side of transponder 634 while turning OFF the receive side of transponder 640 and turning OFF the transmit side of transponder 634.

Figure 6B:
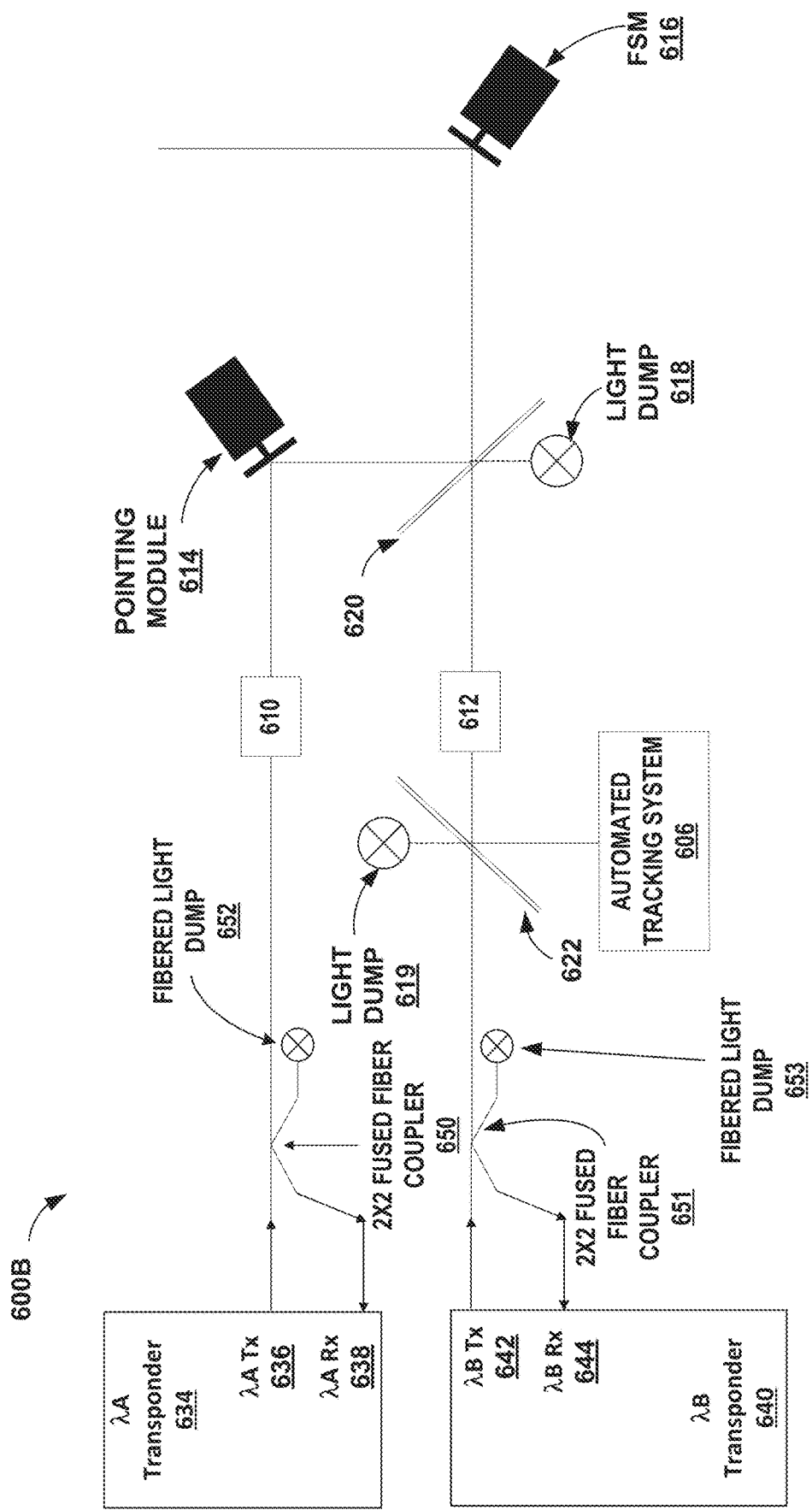
FIG. 6B is a block diagram illustrating an example optical communication system with 2×2 fused fiber couplers configured to connect transponders according to one or more techniques of this disclosure.

FIG. 6B is a block diagram illustrating an example optical communication system with 2×2 fused fiber couplers configured to connect the transponders according to one or more techniques of this disclosure. System 600B is an example of systems 100, 300 and 500 described above in relation to FIGS. 1-5. The functions and characteristics of the components of system 600B may be the same or similar to the functions and characteristics of components described above for systems 100, 300, and 500. Also, the fused fiber couplers and fibered light dumps of system 600B, as well as transponders 634 and 640 may be applied to any of systems 100, 300 and 500 described above in relation to FIGS. 1-5. The functions and characteristics of transponder 634 and transponder 640 of system 600B are the same as described above in relation to FIG. 6A.

In the example of FIG. 6B, fused fiber couplers 650 and 651 are configured as 2×2 fiber couplers. In some examples, a fused fiber coupler may include parallel optical fibers that have been twisted, stretched, and fused together so that the core of each parallel optical fiber is close to each other to form a coupling region. The length of this coupling region may determine the coupling ratio from one fiber to the other. In other words, the optical energy input to a first fiber may "leak" from one fiber core into the other core. If the coupling length is long enough, then a complete transfer of energy can take place from one core into the other. In some examples, a 2×2 fused fiber coupler may carry out the function of a splitter and a combiner in one package.

In the first operational mode, outgoing transmit signal at wavelength λA may travel from transmit port 636 through fused fiber coupler 650, to pointing module 614 and output to a receiving terminal separate from system 600B. Fibered light dump 652 may be configured to absorb energy coupled to the second branch of fused fiber coupler 650. In the second operational mode, fused fiber coupler 650 may direct a part of the received incoming signal at wavelength λA to receive port 638.

Fused fiber coupler 651 operates in a similar manner for transponder 640. In the second operational mode, an outgoing transmit signal at wavelength λB may travel from transmit port 642 through fused fiber coupler 651, through dichroic reflector 622, dichroic reflector 620, and be redirected to a receiving terminal by FSM 616. Fibered light dump 653 may be configured to absorb energy coupled to the second branch of fused fiber coupler 651. In the first operational mode, fused fiber coupler 651 may direct a part of the received incoming signal at wavelength λB to receiving port 644.

Figure 6C:
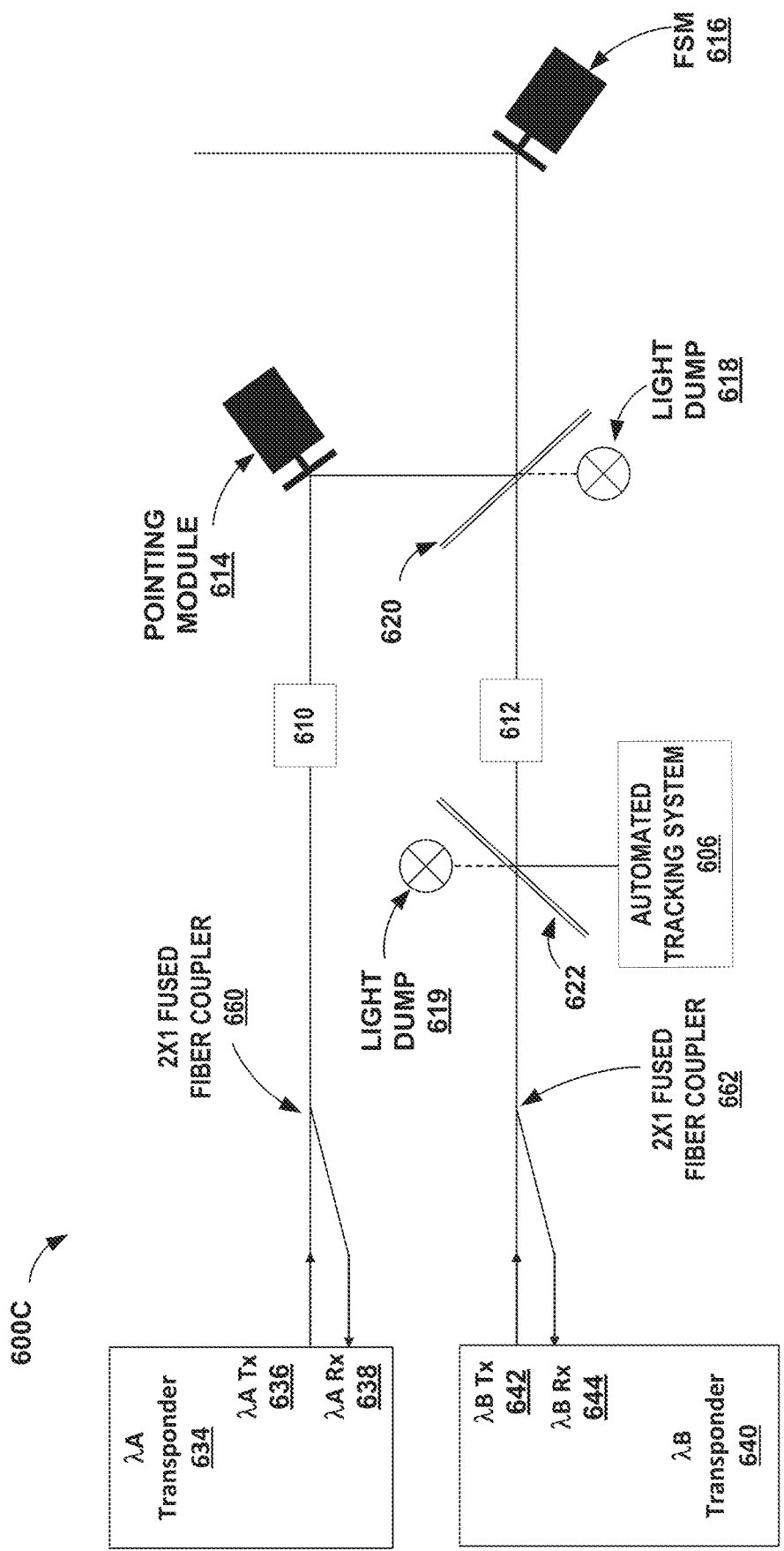
FIG. 6C is a block diagram illustrating an example optical communication system with 1×2 fused fiber couplers configured to connect transponders according to one or more techniques of this disclosure.

FIG. 6C is a block diagram illustrating an example optical communication system with 2×1 fused fiber couplers configured to to connect the transponders according to one or more techniques of this disclosure. System 600C is an example of system 600B described above in relation to FIG. 6B. The functions and characteristics of the components of system 600C may be the same or similar to the functions and characteristics of components described above for systems 100, 300, 500 and 600B. Also, the fused fiber couplers of system 600C, as well as transponders 634 and 640 may be applied to any of systems 100, 300 and 500 described above in relation to FIGS. 1-5. The functions and characteristics of transponder 634 and transponder 640 of system 600B are the same as described above in relation to FIGS. 6A and 6B.

In the first operational mode, an outgoing transmit signal at wavelength λA may travel from transmit port 636 through fused fiber coupler 660, to pointing module 614 and output to a receiving terminal separate from system 600B. In the second operational mode, fused fiber coupler 660 may direct a part of the received incoming signal at wavelength λA to receive port 638.

Fused fiber coupler 662 may operate in a similar manner for transponder 640. In the second operational mode, outgoing transmit signal at wavelength λB may travel from transmit port 642 through fused fiber coupler 662, through dichroic reflector 622, dichroic reflector 620, and be redirected to a receiving terminal by FSM 616. In the first operational mode, fused fiber coupler 662 may direct a part of the received incoming signal at wavelength λB to receiving port 644.

Figure 7A:
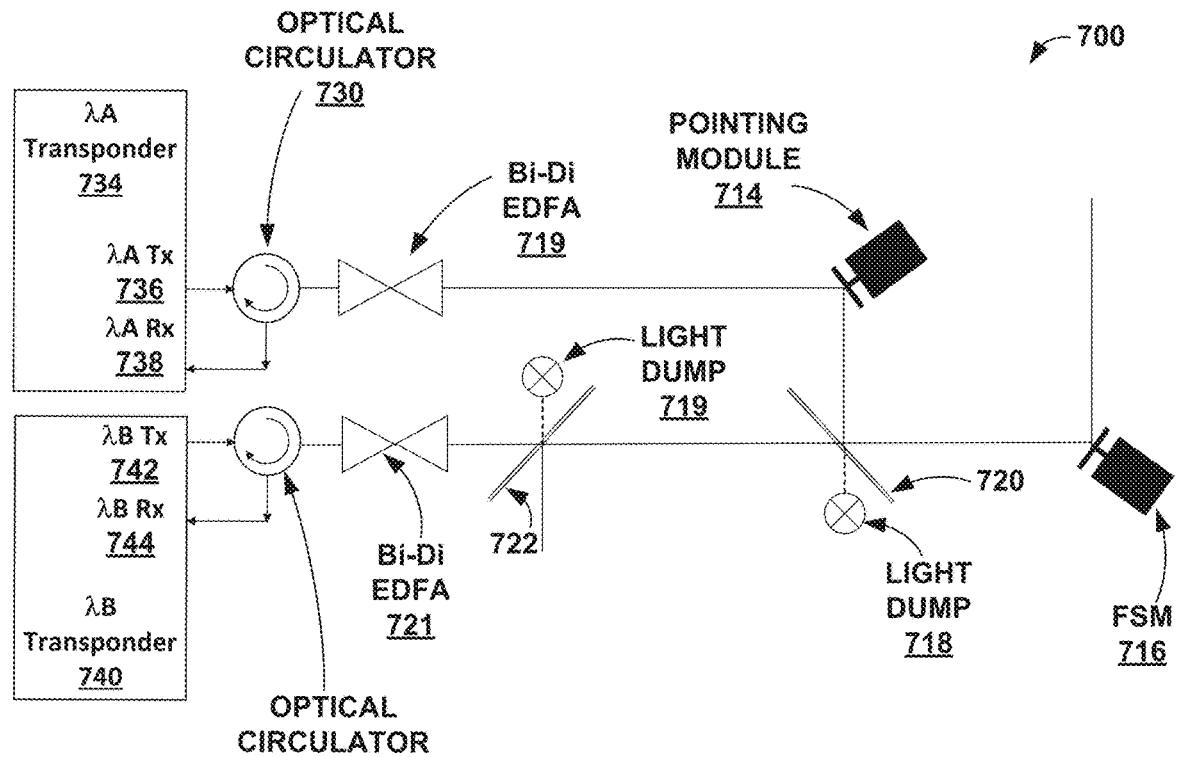
FIGS. 7A and 7B are a block diagrams illustrating an example optical communication system with amplification according to one or more techniques of this disclosure.
Figure 7B:
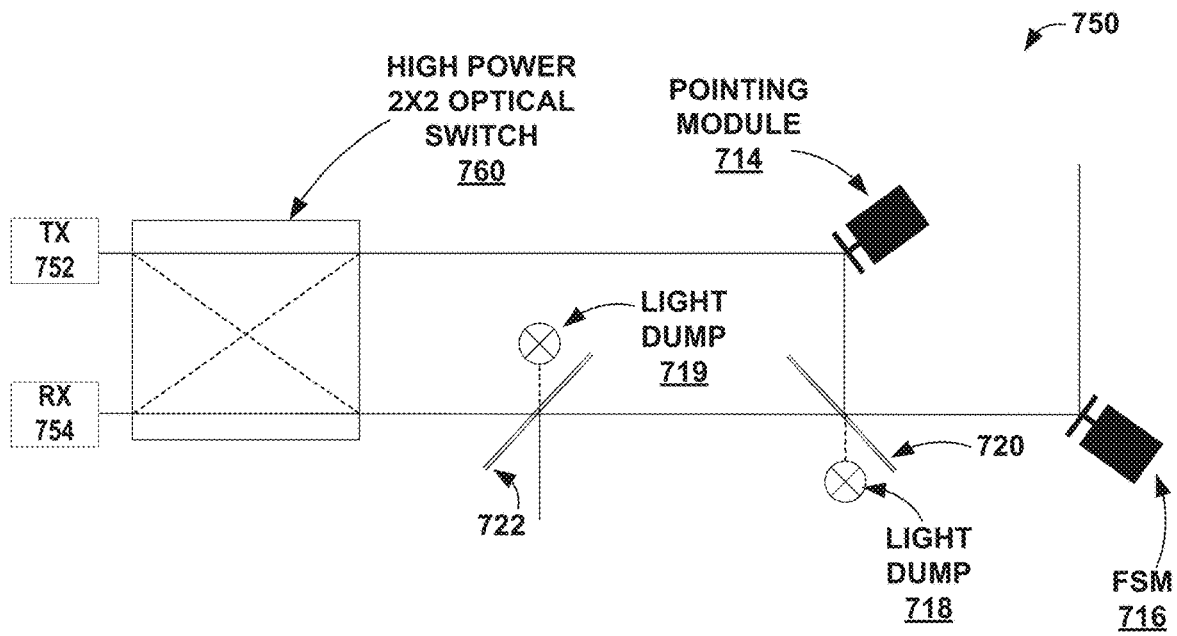

FIGS. 7A and 7B are a block diagrams illustrating an example optical communication system with amplification according to one or more techniques of this disclosure. System 700 is an example of systems 100, 300,500 and 600A described above in relation to FIGS. 1-6A. The functions and characteristics of the components of system 700 may be the same or similar to the functions and characteristics of components described above for systems 100, 300, 500 and 600A-600C. Also, the optical amplifiers such as the bidirectional (Bi-Di) erbium-doped fiber amplifier (EDFA) 719 and power optical switch 760 may be applied to any of systems 100, 300, 500 and 600A-600C described above in relation to FIGS. 1-6C.

In some examples, signals from transponders, e.g., transponder 734, transponder 740, and transceiver 104 described above in relation to FIG. 1 may not be powerful enough to transmit over long distances. Also, the receive components may not be sensitive enough to reliably sense heavily attenuated signals, e.g., signals that travel over very long distances of thousands of kilometres or are attenuated by atmosphere or other causes. Therefore, in some examples, optical amplification may be beneficial for fine steering units, such as the fine steering units in systems 100-700 of this disclosure.

The example of system 700 in FIG. 7A includes transponders 734 and 740 connected through optical circulators 730 and 732 to bi-directional optical amplifiers, BiDi EDFA 719 and 721, respectively. BiDi EDFA 719 and 721 are configured to provide amplification for both transmit and receive sides of the respective transponders 734 and 740. In some examples, system 700 may also include a pump laser (not shown in FIGS. 7A and 7B) to boost the outgoing transmit signal or for a low noise pre-amplifier for the receive signals.

In the first operational mode, outgoing transmit signal at wavelength λA may travel from transmit port 736 through optical circulator 730 and BiDi EDFA 719 may amplify the outgoing signal. Pointing module 714, dichroic reflector 720, and FSM 716 may redirect the amplified outgoing signal and output to a receiving terminal. In the second operational mode, BiDi EDFA 719 amplifies the received incoming signal at wavelength λA that travels to receiving port 738. In some examples, the outgoing and incoming signals may travel through a fused fiber coupler, as described above in relation to FIGS. 6B and 6C rather than the optical circulator 730 depicted in FIG. 7A.

BiDi EDFA 721 may operate in a similar manner for transponder 740. In the second operational mode, an outgoing transmit signal at wavelength λB may travel from transmit port 742 through BiDi EDFA 721. The amplified outgoing signal then travels through dichroic reflector 722 and dichroic reflector 720, and is redirected to a receiving terminal by FSM 716. In the first operational mode, BiDi EDFA 721 may pre-amplify the received incoming signal at wavelength λB. Transponder 740 may further amplify and convert the incoming signal once the signal enters receiving port 744.

In the example of FIG. 7B, system 750 includes optical switch 760, which may be configured to switch outgoing signals from transmit port 752 (Tx 752) and incoming signals to receive port 754 (Rx 754).

In the first operational mode, an outgoing transmit signal at wavelength λA may travel from transmit port 752 through optical switch 760. Pointing module 714, dichroic reflector 720, and FSM 716 may redirect the outgoing signal and output to a receiving terminal. In the second operational mode, optical switch 760 may direct the incoming signal at wavelength λB to receiving port 754.

Optical switch 760 may operate in a similar manner for transponder 740. In the second operational mode, an outgoing transmit signal at wavelength λB may travel from transmit port 752 through optical switch 760. The outgoing signal then travels through dichroic reflector 722 and dichroic reflector 720 and is redirected to a receiving terminal by FSM 716. In the second operational mode, optical switch 760 may direct the incoming signal at wavelength λA to receiving port 754.

As described above in relation to FIGS. 1-7B, any of the components of systems 100-700 may be interchanged with other systems. For example, system 750 may include one or more polarizers and quarter wave plates, described above in relation to FIGS. 3-4B. Any of systems 100-500 may include the optical circulators described above in relation to FIGS. 6A and 7A, or an optical switch. Any of systems 100-600C may include amplifiers, such as the bidirectional amplifiers described above in relation to FIG. 7A, or another type of amplifier.

Figure 8:
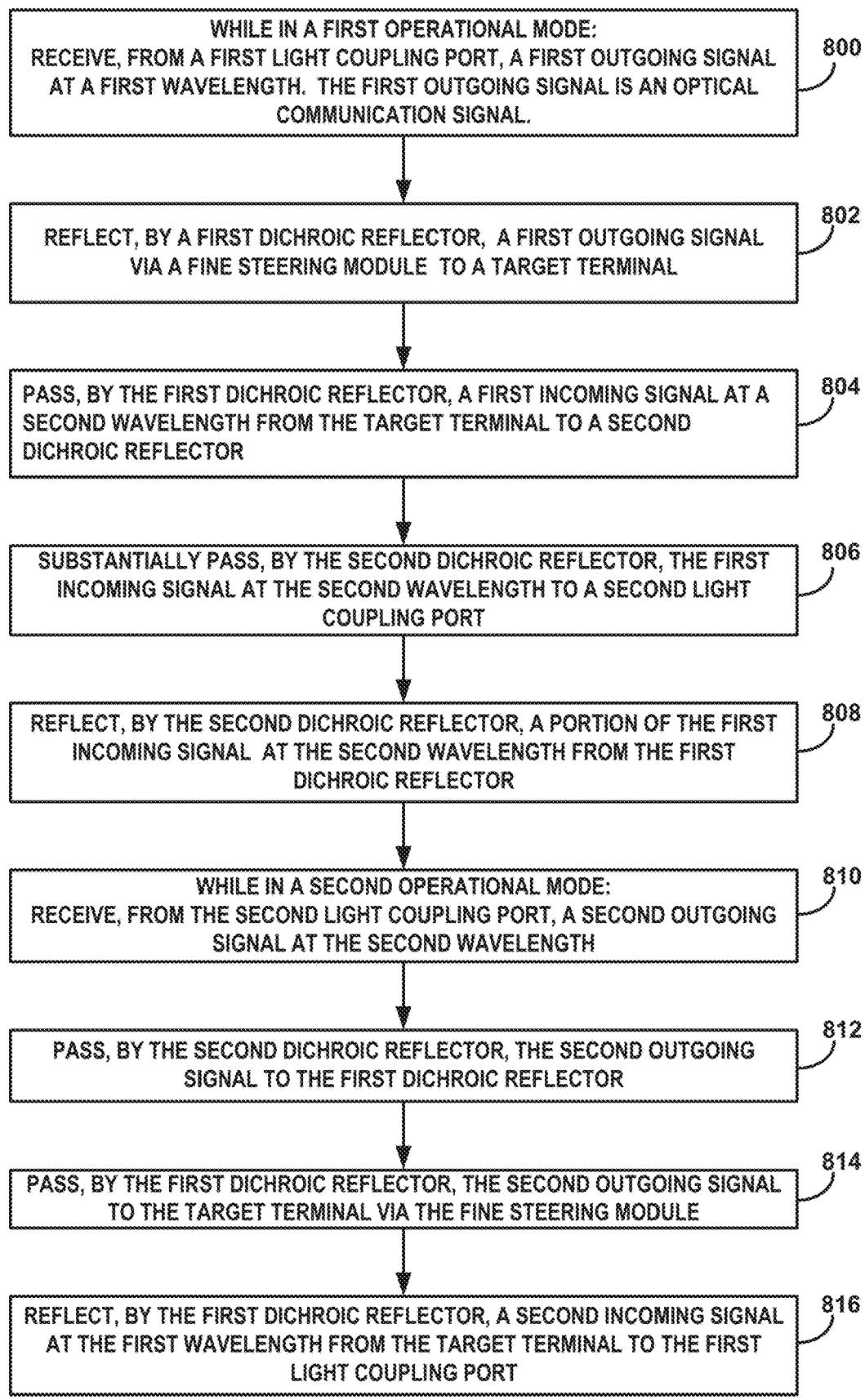
FIG. 8 is a flow chart illustrating an example operation of an optical communication system of this disclosure.

FIG. 8 is a flow chart illustrating an example operation of optical communication system of this disclosure. The blocks of FIG. 8 will be described in terms of systems 100 and 300 depicted in FIGS. 1-4B, unless otherwise noted, but can be used with other example systems described herein.

As seen in the example of FIG. 8, in the first operational mode, fine steering unit 103 initially may receive from a first light coupling port 124, a first outgoing signal 200 at a first wavelength, e.g., λA (800). In some examples fine steering unit 103 may be considered an optical communication device and may be configured for duplex communication. In other examples, system 100, system 300, and so on, may be considered to be an optical communication device. Outgoing signal 200 is an optical communication signal.

Next, first dichroic reflector 120 may reflect outgoing signal 200 via fine steering module 116 to a target terminal, e.g., a separate optical communication device (802). In some examples, optical transmission line 110 may be a polarization maintaining fiber configured for either s-polarization or p-polarization. Outgoing signal 200 may also pass through one or more amplifiers, polarizers, e.g., s-polarizer 327, and QWP 330, as described above in relation to FIGS. 3-4B, 7a and 7B.

While in the first operational mode, e.g., configuration A, first dichroic reflector 120 may pass first incoming signal at a second wavelength e.g., λB, from the target terminal to second dichroic reflector 122 (804). As described above in relation to FIG. 4A, one or more polarizing elements may attenuate any back reflection from outgoing signal 200.

Dichroic reflector 122 may substantially pass incoming signal 204 to light coupling port 126, for further amplification, etc. at transceiver 104 (806). Second dichroic reflector 122 may reflect a portion 208 of the first incoming signal 204 at the second wavelength λB from the first dichroic reflector 120 to automated tracking system 106 (808). The reflected portion 208 sensed by ATS 106 may provide a closed loop feedback signal to FSM 116.

In the second operational mode, dichroic reflector 122 may receive from the second light coupling port a second outgoing signal 254 at the second wavelength λB (810). Next, second dichroic reflector 122 may pass the second outgoing signal 254 to the first dichroic reflector 120 (812).

The first dichroic reflector 120 may pass the second outgoing signal 254 to the target terminal via the fine steering module, FSM 116 (814). Outgoing signal 254 may also pass through one or more amplifiers and polarizing elements. While in the second operational mode, dichroic reflector 120 may reflect a second incoming signal 250 at the first wavelength λA from the target terminal to the first light coupling port 124 (816).

In one or more examples, the functions described above may be implemented in hardware, software, firmware, or any combination thereof. For example, portions of transceiver 104 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The term "non-transitory" may indicate that the storage medium is not embodied in a carrier wave or a propagated signal. In certain examples, a non-transitory storage medium may store data that can, over time, change (e.g., in RAM or cache).

By way of example, and not limitation, such computer-readable storage media, may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein, may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The techniques of this disclosure may also be described in the following examples.

Example 1: An optical communication device configured for duplex communication, the device comprising: a first light coupling port; a second light coupling port; a first dichroic reflector configured to substantially reflect a first wavelength pass a portion of the first wavelength, and pass a second wavelength; a second dichroic reflector configured to substantially pass the second wavelength, reflect a portion of the second wavelength, and reflect the first wavelength, wherein the second dichroic reflector is located between the second light coupling port and the first dichroic reflector, and a fine steering module, wherein, while the device is in a first operational mode, the first dichroic reflector is configured to: substantially reflect a first outgoing signal at the first wavelength from the first light coupling port to the fine steering module, and to pass a first incoming signal at the second wavelength from the fine steering module to the second dichroic reflector, and wherein while the device is in a second operational mode, the first dichroic reflector is configured to: substantially reflect a second incoming signal at the first wavelength from the fine steering module to the first light coupling port; pass a portion of the second incoming signal at the first wavelength from the fine steering module to the second dichroic reflector; and pass a second outgoing signal at the second wavelength from the second dichroic reflector to the fine steering module, and wherein the second dichroic reflector is configured to: substantially pass the first incoming signal at the second wavelength from the first dichroic reflector to the second light coupling port and to reflect a portion of the first incoming signal at the second wavelength from the first dichroic reflector during the first operational mode; and reflect the portion of the second incoming signal at the first wavelength from the first dichroic reflector and to substantially pass the second outgoing signal at the second wavelength from the second light coupling port to the first dichroic reflector during the second operational mode.

Example 2: The device of example 1, further includes a first polarization control element placed between the first light coupling port and the first dichroic reflector; and a second polarization control element placed between the first dichroic reflector and second dichroic reflector.

Example 3: The device of examples 1 or 2, further comprising a quarter-wave plate (QWP) placed between the fine steering module and the first dichroic reflector.

Example 4: The device of any combination of examples 2 or 3, further including: a first quarter-wave plate (QWP) placed between the first polarization control element and the first dichroic reflector; and a second quarter-wave plate placed between the second polarization control element and the first dichroic reflector.

Example 5: The device of any combination of examples 1 through 4, further comprising an optical amplifier configured to amplify the first outgoing signal while in the first operational mode and the second incoming signal while in the second operational mode.

Example 6: The device of any combination of examples 1 through 5, wherein the optical amplifier is a first optical amplifier, the device further comprising a second optical amplifier configured to amplify the second outgoing signal while in the second operational mode and the second incoming signal while in the first operational mode.

Example 7: The device of any combination of examples 1 through 6, wherein the first optical amplifier and the second optical amplifier comprise bidirectional erbium-doped fiber amplifiers (EDFA).

Example 8: The device of any combination of examples 1 through 7, further comprising a power optical switch.

Example 9: The device of any combination of examples 1 through 8, wherein the first light coupling port is a port of a first optical circulator, and wherein the second light coupling port is a port of a second optical circulator.

Example 10: A method comprising: while in a first operational mode: receiving, from a first light coupling port, a first outgoing signal at a first wavelength, wherein the first outgoing signal is an optical communication signal; reflecting, by a first dichroic reflector first outgoing signal via a fine steering module to a target terminal; passing, by the first dichroic reflector a first incoming signal at a second wavelength from the target terminal to a second dichroic reflector; substantially passing, by the second dichroic reflector the first incoming signal at the second wavelength to a second light coupling port reflecting, by the second dichroic reflector a portion of the first incoming signal at the second wavelength from the first dichroic reflector; and while in a second operational mode: receiving, from the second light coupling port, a second outgoing signal at the second wavelength; passing, by the second dichroic reflector, the second outgoing signal to the first dichroic reflector; passing, by the first dichroic reflector the second outgoing signal to the target terminal via the fine steering module; and reflecting, by the first dichroic reflector a second incoming signal at the first wavelength from the target terminal to the first light coupling port.

Example 11: A system comprising: an optical transceiver configured to transmit and receive free space optical communication signals and including a first dichroic reflector configured to substantially reflect a first wavelength, pass a second wavelength and a portion of the first wavelength; a second dichroic reflector configured to substantially pass the second wavelength and reflect the first wavelength and a portion of the second wavelength, wherein the second dichroic reflector is located between a second light coupling port and the first dichroic reflector, and a fine steering module, wherein: while the device is in a first operational mode, the first dichroic reflector is configured to: substantially reflect a first outgoing signal at the first wavelength from the first light coupling port to the fine steering module, and to pass a first incoming signal at the second wavelength from the fine steering module to the second dichroic reflector, and while the device is in a second operational mode, the first dichroic reflector is configured to: substantially reflect a second incoming signal at the first wavelength from the fine steering module to a first light coupling port; pass a portion of the second incoming signal at the first wavelength from the fine steering module to the second dichroic reflector; and pass a second outgoing signal at the second wavelength from the second dichroic reflector to the fine steering module, and wherein the second dichroic reflector is configured to: substantially pass the first incoming signal at the second wavelength from the first dichroic reflector to the second light coupling port and to reflect a portion of the first incoming signal at the second wavelength from the first dichroic reflector during the first operational mode; and reflect the portion of the second incoming signal at the first wavelength from the first dichroic reflector and to substantially pass the second outgoing signal at the second wavelength from the second light coupling port to the first dichroic reflector during the second operational mode.

Example 12: The system of example 11, further includes control the operation of the fine steering module; receive the portion of the first incoming signal at the second wavelength during the first operational mode; receive the portion of the second incoming signal at the first wavelength during the second operational mode.

Example 13: The system of examples 11 or 12, wherein the system is configured to transmit and receive the optical communication signals with a target terminal, the system further includes operate with a point ahead function during the first operational mode to compensate for relative motion of the target terminal caused by a finite time-of-flight of light between transmit and receive; operate with point behind function during the second operational mode to correct the receive path from mispointing caused by the finite time-of-flight between transmit and receive.

Example 14: The system of any combination of examples 11 through 13, further includes a first polarization control element placed between the first light coupling port and the first dichroic reflector; and a second polarization control element placed between the first dichroic reflector and second dichroic reflector.

Example 15: The system of any combination of examples 11 through 14, further comprising a quarter-wave plate (QWP) placed between the fine steering module and the first dichroic reflector.

Example 16: The system of any combination of examples 11 through 15, further includes a first quarter-wave plate (QWP) placed between the first polarization control element and the first dichroic reflector; and a second quarter-wave plate placed between the second polarization control element and the first dichroic reflector.

Example 17: The system of any combination of examples 11 through 16, further comprising an optical amplifier configured to amplify the first outgoing signal while in the first operational mode and the second incoming signal while in the second operational mode.

Example 18: The device of any combination of examples 11 through 17, wherein the optical amplifier is a first optical amplifier, the device further comprising a second optical amplifier configured to amplify the second outgoing signal while in the second operational mode and the second incoming signal while in the first operational mode.

Example 19: The device of any combination of examples 11 through 18, wherein the first optical amplifier and the second optical amplifier comprise bidirectional erbium-doped fiber amplifiers (EDFA).

Example 20: The system of any combination of examples 11 through 19, further comprising a power optical switch.

Example 21: The system of any combination of examples 11 through 20, wherein the first light coupling port is a port of a first optical circulator, and wherein the second light coupling port is a port of a second optical circulator.

Various examples of this disclosure have been described. These and other examples are within the scope of the following claims.

What is claimed is:

1. An optical communication device configured for duplex communication, the device comprising:
   a first light coupling port;
   a second light coupling port;
   a first dichroic reflector configured to substantially reflect a first wavelength, pass a portion of the first wavelength, and pass a second wavelength;
   a second dichroic reflector configured to substantially pass the second wavelength, reflect a portion of the second wavelength, and reflect the first wavelength, wherein the second dichroic reflector is located between the second light coupling port and the first dichroic reflector, and
   a fine steering module, wherein, in response to the device being in a first operational mode, the first dichroic reflector is configured to:
      substantially reflect a first outgoing signal at the first wavelength from the first light coupling port to the fine steering module, and
      to pass a first incoming signal at the second wavelength from the fine steering module to the second dichroic reflector, and
   wherein, in response to the device being in a second operational mode, the first dichroic reflector is configured to:
      substantially reflect a second incoming signal at the first wavelength from the fine steering module to the first light coupling port;
      pass a portion of the second incoming signal at the first wavelength from the fine steering module to the second dichroic reflector; and
      pass a second outgoing signal at the second wavelength from the second dichroic reflector to the fine steering module, and
   wherein the second dichroic reflector is configured to:
      substantially pass the first incoming signal at the second wavelength from the first dichroic reflector to the second light coupling port and to reflect a portion of the first incoming signal at the second wavelength from the first dichroic reflector during the first operational mode; and
      reflect the portion of the second incoming signal at the first wavelength from the first dichroic reflector and to substantially pass the second outgoing signal at the second wavelength from the second light coupling port to the first dichroic reflector during the second operational mode.

2. The device of claim 1, further comprising:
   a first polarization control element placed between the first light coupling port and the first dichroic reflector; and
   a second polarization control element placed between the first dichroic reflector and second dichroic reflector.

3. The device of claim 2, further comprising a quarter-wave plate placed between the fine steering module and the first dichroic reflector.

4. The device of claim 2, further comprising:
   a first quarter-wave plate placed between the first polarization control element and the first dichroic reflector; and
   a second quarter-wave plate placed between the second polarization control element and the first dichroic reflector.

5. The device of claim 1, further comprising an optical amplifier configured to amplify the first outgoing signal while in the first operational mode and the second incoming signal while in the second operational mode.

6. The device of claim 5, wherein the optical amplifier is a first optical amplifier, the device further comprising a second optical amplifier configured to amplify the second outgoing signal while in the second operational mode and the second incoming signal while in the first operational mode.

7. The device of claim 6, wherein the first optical amplifier and the second optical amplifier comprise bidirectional erbium-doped fiber amplifiers.

8. The device of claim 1, further comprising an optical switch.

9. The device of claim 1,
wherein the first light coupling port is a port of a first optical circulator, and
wherein the second light coupling port is a port of a second optical circulator.

10. A method comprising:
while in a first operational mode:
receiving, from a first light coupling port, a first outgoing signal at a first wavelength, wherein the first outgoing signal is an optical communication signal;
reflecting, by a first dichroic reflector, the first outgoing signal via a fine steering module to a target terminal;
passing, by the first dichroic reflector, a first incoming signal at a second wavelength from the target terminal to a second dichroic reflector;
substantially passing, by the second dichroic reflector, the first incoming signal at the second wavelength to a second light coupling port;
reflecting, by the second dichroic reflector, a portion of the first incoming signal at the second wavelength from the first dichroic reflector; and
while in a second operational mode:
receiving, from the second light coupling port, a second outgoing signal at the second wavelength;
passing, by the second dichroic reflector, the second outgoing signal to the first dichroic reflector;
passing, by the first dichroic reflector, the second outgoing signal to the target terminal via the fine steering module; and
reflecting, by the first dichroic reflector a second incoming signal at the first wavelength from the target terminal to the first light coupling port.

11. A system comprising:
an optical transceiver configured to transmit and receive free space optical communication signals and comprising a first light coupling port and a second light coupling port;
an optical communication device, configured for duplex communication, the device comprising:
a first dichroic reflector configured to substantially reflect a first wavelength and pass a second wavelength and a portion of the first wavelength;
a second dichroic reflector configured to substantially pass the second wavelength and reflect the first wavelength and a portion of the second wavelength, wherein the second dichroic reflector is located between a second light coupling port and the first dichroic reflector, and
a fine steering module, wherein:
while the device is in a first operational mode, the first dichroic reflector is configured to:
substantially reflect a first outgoing signal at the first wavelength from a first light coupling port to the fine steering module, and
to pass a first incoming signal at the second wavelength from the fine steering module to the second dichroic reflector, and
while the device is in a second operational mode, the first dichroic reflector is configured to:
substantially reflect a second incoming signal at the first wavelength from the fine steering module to the first light coupling port;
pass a portion of the second incoming signal at the first wavelength from the fine steering module to the second dichroic reflector; and
pass a second outgoing signal at the second wavelength from the second dichroic reflector to the fine steering module, and wherein the second dichroic reflector is configured to:
substantially pass the first incoming signal at the second wavelength from the first dichroic reflector to the second light coupling port and to reflect a portion of the first incoming signal at the second wavelength from the first dichroic reflector during the first operational mode; and
reflect the portion of the second incoming signal at the first wavelength from the first dichroic reflector and to substantially pass the second outgoing signal at the second wavelength from the second light coupling port to the first dichroic reflector during the second operational mode.

12. The system of claim 11, further comprising an automated tracking system configured to:
control operation of the fine steering module;
receive the portion of the first incoming signal at the second wavelength during the first operational mode;
receive the portion of the second incoming signal at the first wavelength during the second operational mode.

13. The system of claim 11, wherein the system is configured to transmit and receive the optical communication signals with a target terminal, the system further comprising a pointing module configured to:
operate with a point ahead function during the first operational mode to compensate for relative motion of the target terminal caused by a finite time-of-flight of light between transmit and receive;
operate with point behind function during the second operational mode to correct the receive path from mispointing caused by the finite time-of-flight of light between transmit and receive.

14. The system of claim 11, further comprising:
a first polarization control element placed between the first light coupling port and the first dichroic reflector; and
a second polarization control element placed between the first dichroic reflector and second dichroic reflector.

15. The system of claim 14, further comprising a quarter-wave plate placed between the fine steering module and the first dichroic reflector.

16. The system of claim 14, further comprising:
a first quarter-wave plate placed between the first polarization control element and the first dichroic reflector; and
a second quarter-wave plate placed between the second polarization control element and the first dichroic reflector.

17. The system of claim 11, further comprising an optical amplifier configured to amplify the first outgoing signal while in the first operational mode and the second incoming signal while in the second operational mode.

18. The system of claim 17, wherein the optical amplifier is a first optical amplifier, the device further comprising a second optical amplifier configured to amplify the second outgoing signal while in the second operational mode and the second incoming signal while in the first operational mode.

19. The system of claim 18, wherein the first optical amplifier and the second optical amplifier comprise bidirectional erbium-doped fiber amplifiers.

20. The system of claim 11,
wherein the first light coupling port is a port of a first optical circulator, and
wherein the second light coupling port is a port of a second optical circulator.

\* \* \* \* \*